United States Patent [19]

Childress et al.

[11] Patent Number: 4,682,367

[45] Date of Patent: Jul. 21, 1987

[54] MOBILE RADIO COMMUNICATIONS SYSTEM WITH JOIN FEATURE

[75] Inventors: Jeffery S. Childress, Lynchburg; Marc A. Dissosway, Forest; Houston H. Hughes, III, Lynchburg, all of Va.

[73] Assignee: General Electric Company, Lynchburg, Va.

[21] Appl. No.: 797,503

[22] Filed: Nov. 13, 1985

[51] Int. Cl.$^4$ .......................... H04B 7/14; H04B 1/00
[52] U.S. Cl. ....................................... 455/17; 455/32; 455/34; 455/77; 379/63
[58] Field of Search ....................... 455/15, 17, 32–34, 455/54, 77, 78; 370/24, 32; 379/59, 60, 63

[56] References Cited

U.S. PATENT DOCUMENTS

| | | |
|---|---|---|
| 2,533,662 | 12/1950 | Bartelink . |
| 3,173,996 | 3/1965 | Rypinski, Jr. . |
| 3,376,509 | 4/1968 | Willcox et al. . |
| 3,387,212 | 6/1968 | Kaufman . |
| 3,426,279 | 2/1969 | Berman . |
| 3,535,636 | 10/1970 | Muilwijk . |
| 3,539,924 | 11/1970 | Daskalakis et al. . |
| 3,555,424 | 1/1971 | Malm . |
| 3,582,787 | 6/1971 | Muller et al. . |
| 3,634,627 | 1/1972 | Velentini . |
| 3,663,762 | 5/1972 | Joel, Jr. . |
| 3,707,679 | 12/1972 | Bruley et al. . |
| 3,716,790 | 2/1973 | Romoser . |
| 3,764,915 | 10/1973 | Cox et al. . |
| 3,808,537 | 4/1974 | Sarati et al. . |
| 3,898,390 | 8/1975 | Wells et al. . |
| 3,913,017 | 10/1975 | Imaseki . |
| 4,009,442 | 2/1977 | von Bromssen . |
| 4,013,958 | 3/1977 | Spayth . |
| 4,112,257 | 9/1978 | Frost . |
| 4,125,808 | 11/1978 | Graham . |
| 4,127,744 | 11/1978 | Yoshikawa et al. . |
| 4,129,749 | 12/1978 | Goldman . |
| 4,144,411 | 3/1979 | Frenkiel . |
| 4,144,412 | 3/1979 | Ito et al. . |
| 4,144,496 | 3/1979 | Cunningham et al. . |
| 4,187,398 | 2/1980 | Stark . |

(List continued on next page.)

FOREIGN PATENT DOCUMENTS

| | | |
|---|---|---|
| 2030347 | 9/1978 | Fed. Rep. of Germany . |
| 850698 | 10/1960 | United Kingdom . |
| 1145899 | 3/1969 | United Kingdom . |
| 1175130 | 12/1969 | United Kingdom . |
| 1185789 | 3/1970 | United Kingdom . |
| 1276941 | 6/1972 | United Kingdom . |
| 1297071 | 11/1972 | United Kingdom . |

OTHER PUBLICATIONS

Rybicki et al, "The Basics of Trunked Mobile Radio" (Mobile Times, Oct. 1980). IMTS Telephone Service article (designated LBI-8748A) published by GE.

Primary Examiner—Jin F. Ng
Attorney, Agent, or Firm—Nixon & Vanderhye

[57] ABSTRACT

Cooperation between two repeater transceivers of a radio trunking system causes a mobile radio transceiver to join or rejoin ongoing communications. To join ongoing communications, a radio transceiver attempts to acquire a free repeater communications channel by transmitting call signalling identifying a group of transceivers to be contacted. If the group to be contacted is already communicating on another repeater communications channel, the calling radio transceiver is forced to leave the communications channel it is trying to acquire and to begin scanning communications channels in search of call signalling identifying it. Meanwhile, the repeater permitting the ongoing communication interrupts the ongoing communications briefly and transmits the call signalling identifying the group of transceivers to be joined (including the radio transceiver which is to join the ongoing communications). The radio transceiver to be joined detects the call signalling transmitted by the repeater, locks onto the repeater channel over which the call signalling is being transmitted, and joins the ongoing communications. Land line callers are also permitted to join ongoing communications.

12 Claims, 14 Drawing Figures

U.S. PATENT DOCUMENTS

| | | |
|---|---|---|
| 4,228,319 | 10/1980 | De Jager et al. |
| 4,233,473 | 11/1980 | Frost |
| 4,242,538 | 12/1980 | Ito et al. |
| 4,281,413 | 7/1981 | Forrest |
| 4,308,429 | 12/1981 | Kai et al. |
| 4,310,722 | 1/1982 | Schaible |
| 4,347,625 | 8/1982 | Williams |
| 4,352,955 | 10/1982 | Kai et al. |
| 4,360,927 | 11/1982 | Bowen et al. |
| 4,376,310 | 3/1983 | Stackhouse et al. |
| 4,384,362 | 5/1983 | Leland |
| 4,398,063 | 8/1983 | Hass et al. |
| 4,409,687 | 10/1983 | Berti et al. |
| 4,435,840 | 3/1984 | Kojima et al. |
| 4,475,010 | 10/1984 | Huensch et al. |
| 4,553,262 | 11/1985 | Coe ........ 455/17 |
| 4,612,415 | 9/1986 | Zdunek et al. ........ 179/2 EB |

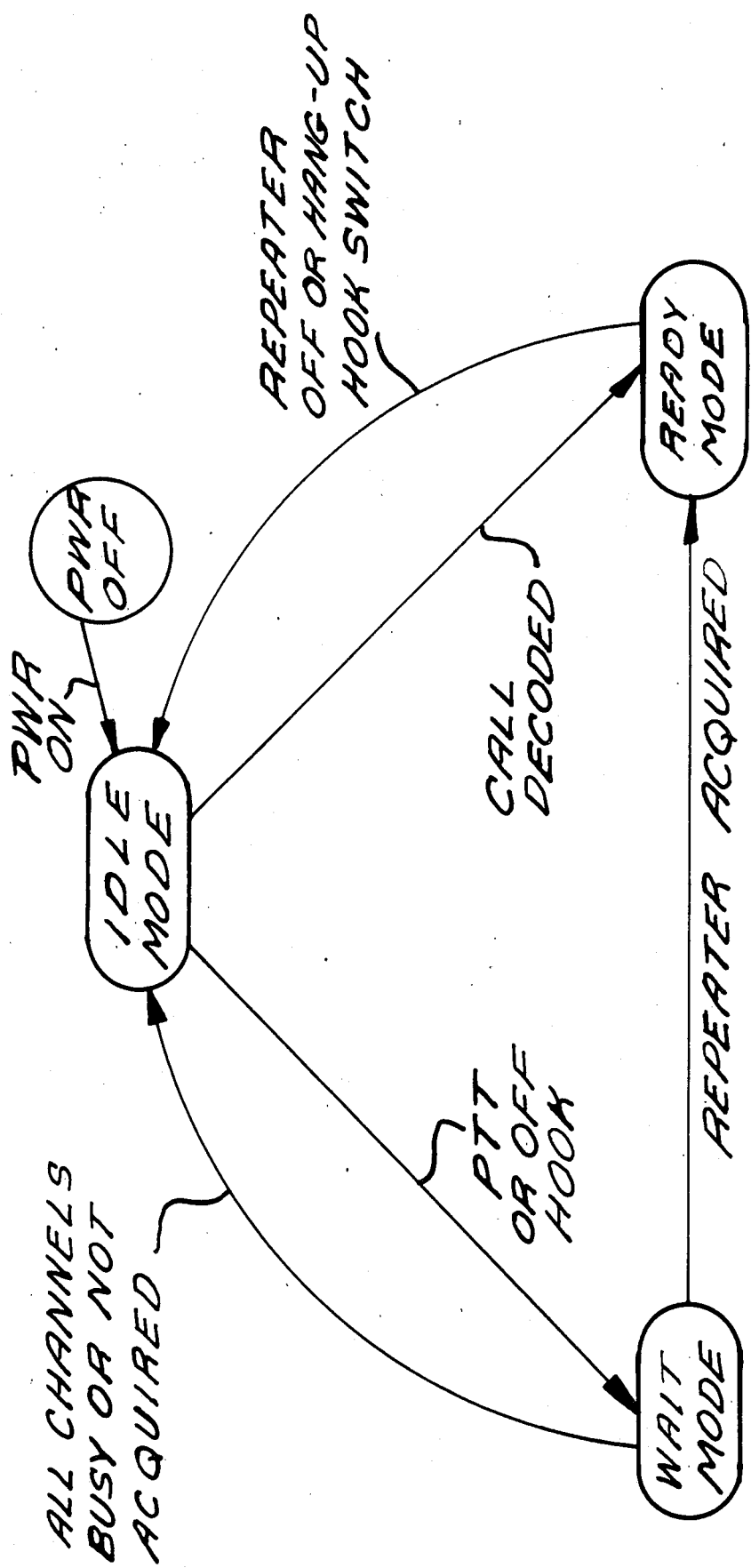

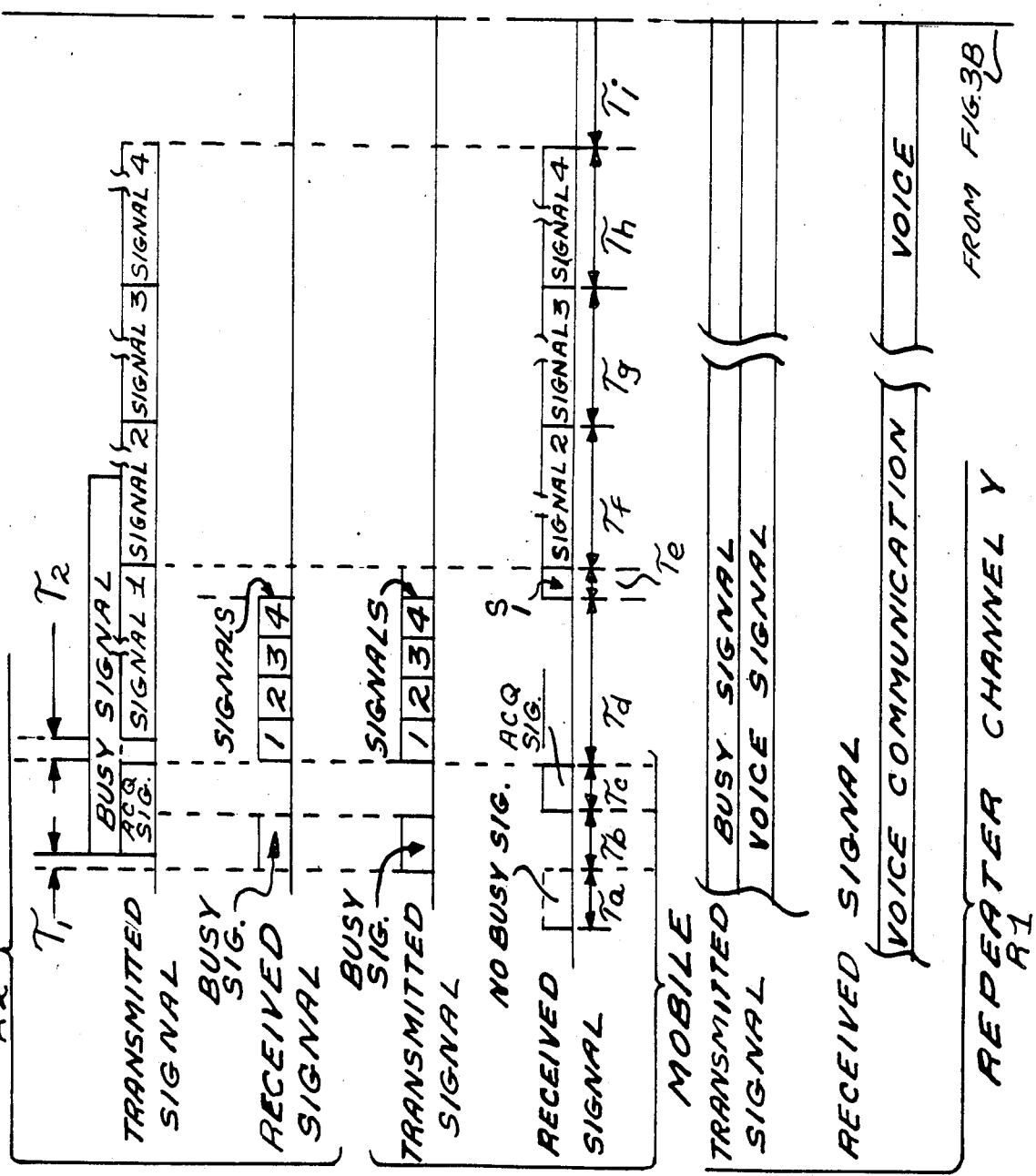

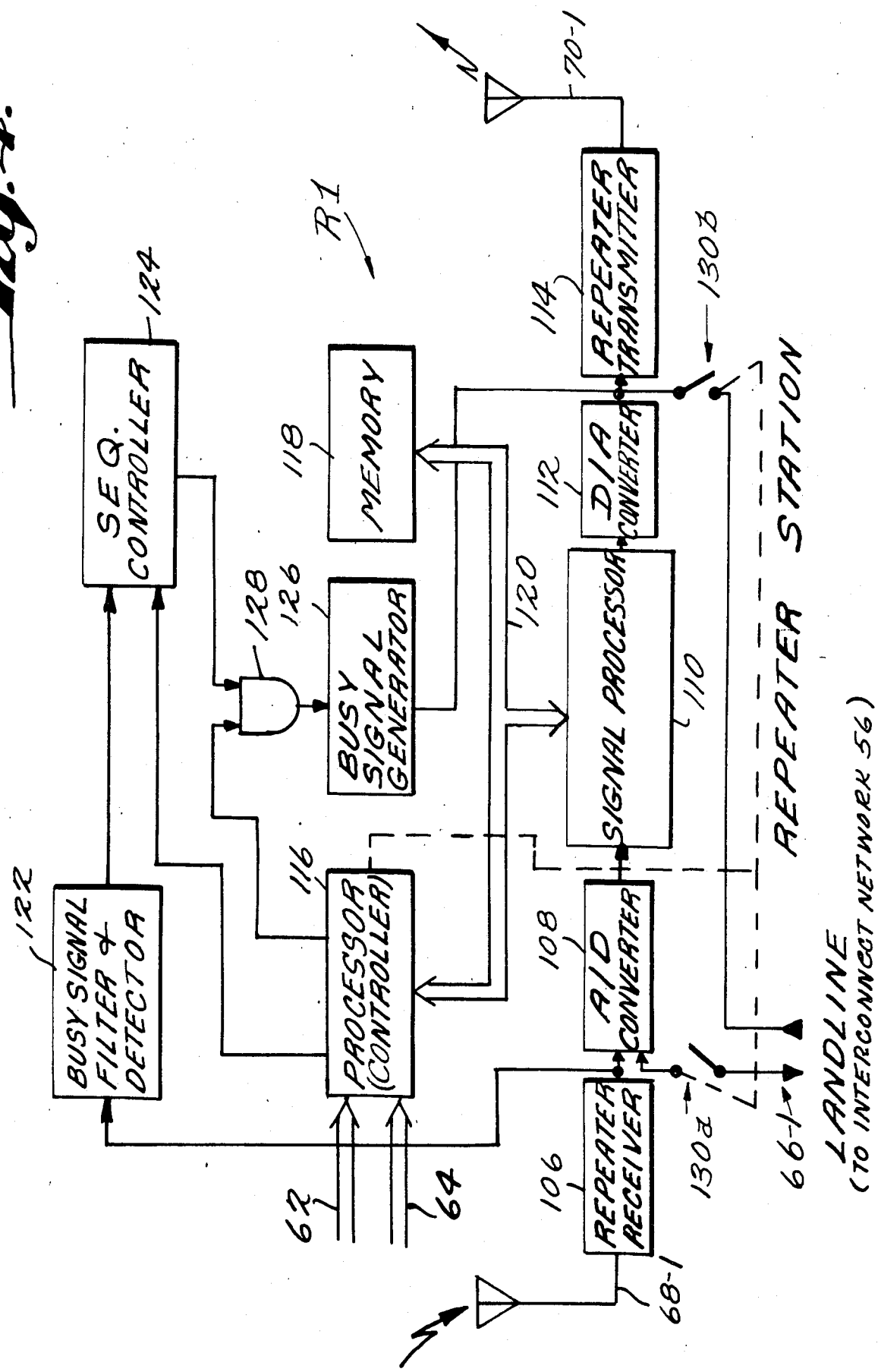

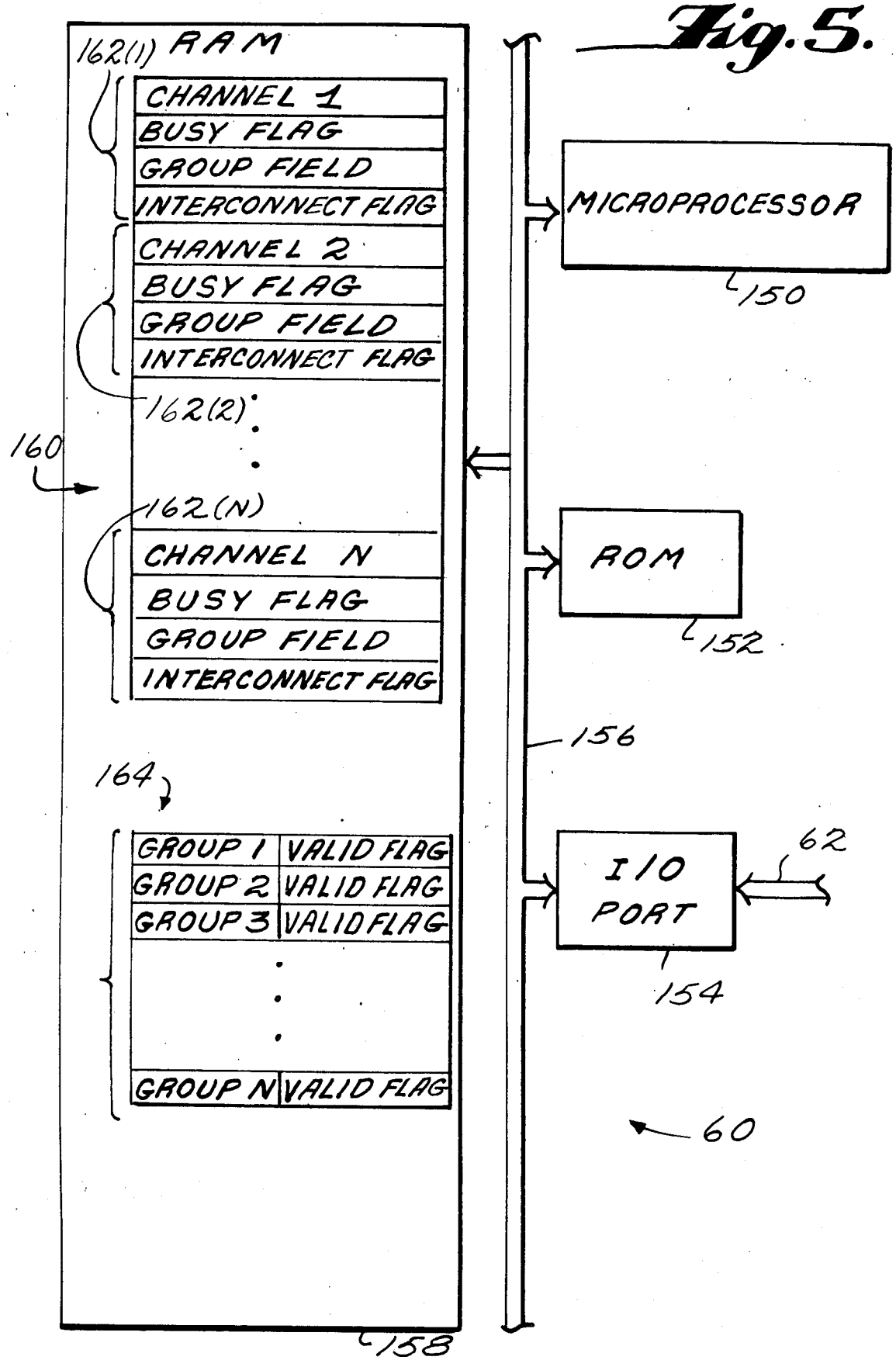

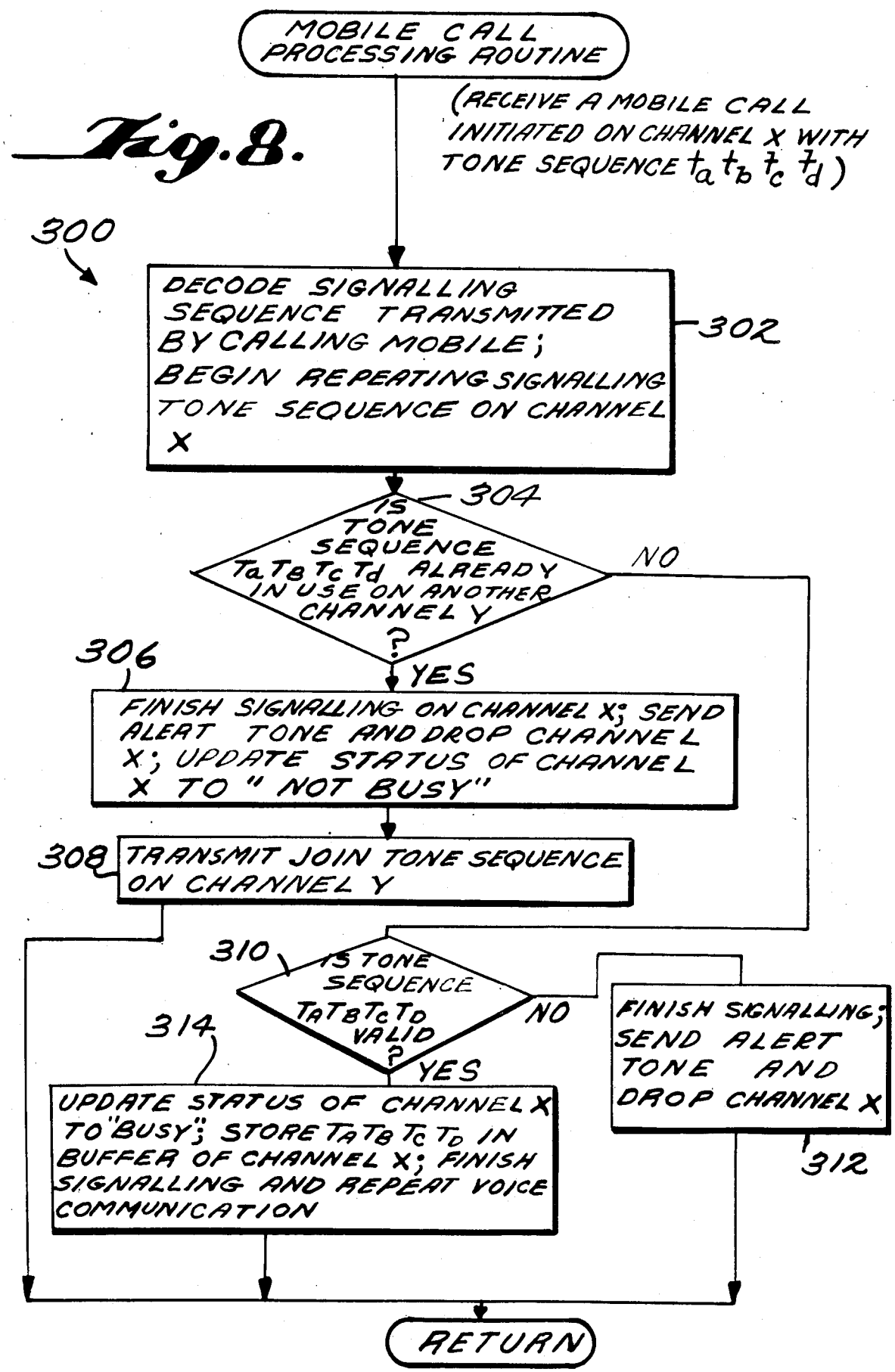

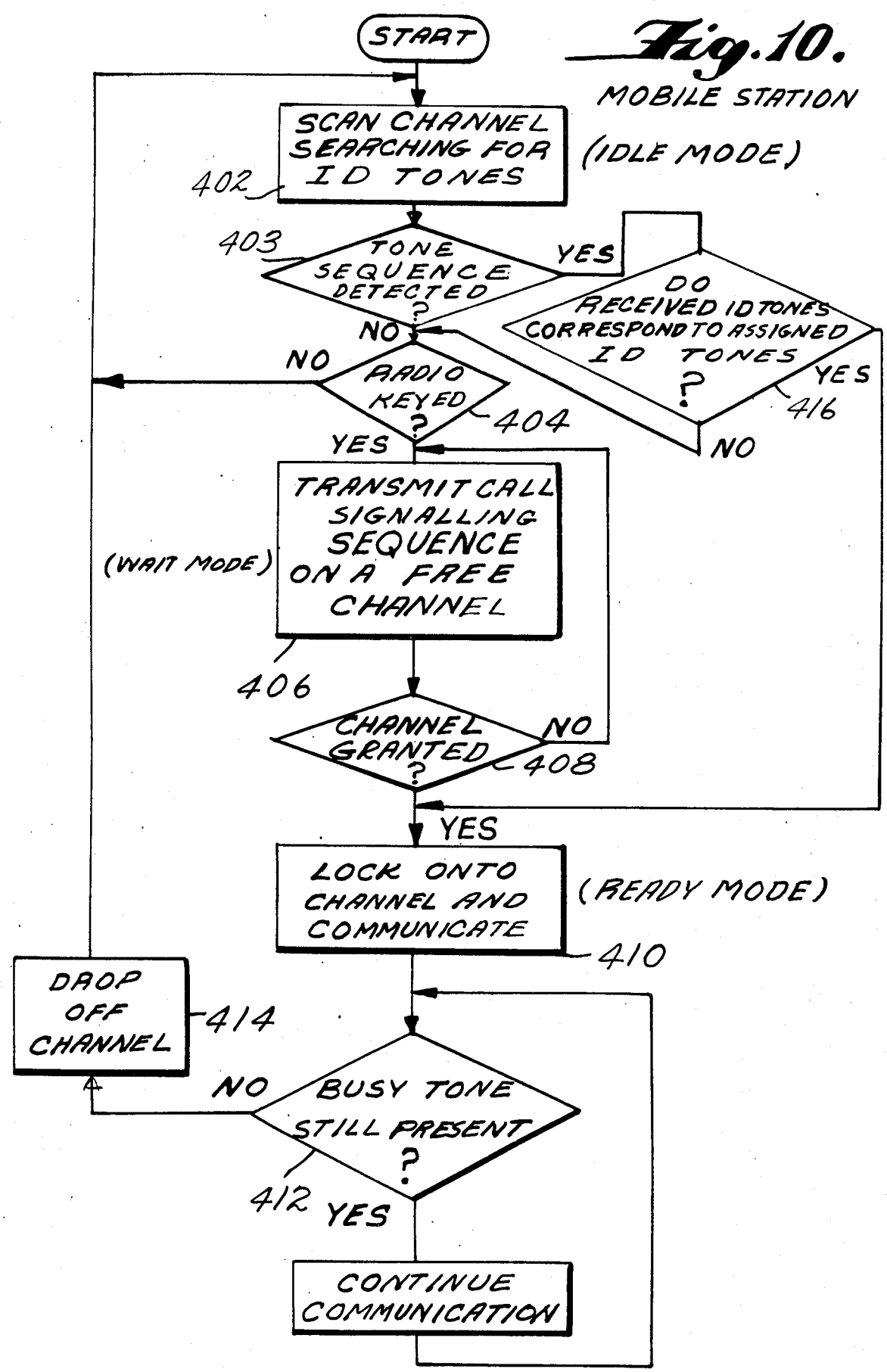

MOBILE STATION READY ROUTINE

MOBILE RADIO COMMUNICATIONS SYSTEM WITH JOIN FEATURE

CROSS REFERENCE TO RELATED APPLICATIONS

This application is related to copending commonly-assigned U.S. patent application Ser. Nos. 645,710 filed Sept. 17, 1984, now abandoned; 721,815 filed Apr. 10, 1985 and 725,682 filed Apr. 22, 1985, now U.S. Pat. No. 4,649,567. The disclosures of these related applications are hereby incorporated into this application by reference.

FIELD OF THE INVENTION

This invention relates generally to trunking radio repeater systems, and more specifically, to radio communications systems wherein a plurality of mobile or portable radio transceivers communicate with one another over communications channels through radio repeaters operating on such channels. Even more specifically, this invention relates to a technique by which additional radio transceivers may be brought onto a communications channel already acquired by other radio transceivers and dedicated to ongoing communications between those other radio transceivers. The invention may be used advantageously with different signalling arrangements including tone signalling and digital signalling protocols.

BACKGROUND OF THE INVENTION

In many localities, a plurality of radio frequency channels are allocated for use by mobile radio transceivers. Each of these radio channels usually includes at least two separate and distinct frequencies, one for transmitting and the other for receiving. Generally, there may be, and usually are many more mobile radio transceivers than there are available radio channels in a given locality.

Consequently, some arrangement is needed for sharing available spectrum space among users. One such arrangement enables a mobile radio transceiver user to obtain access to a radio channel that is not in use (without disturbing the privacy of channels already in use) and to thereafter establish communication with one or more other specifically designated mobile transceivers over that acquired radio frequency channel. When the user is finished using the channel, he or she relinquishes it for use by other mobile transceivers. One such system for establishing communication between mobile radio transceivers through a repeater over a radio frequency channel selected from a plurality of such channels is disclosed in commonly-assigned U.S. Pat. No. 4,360,927 to Bowen et al issued Nov. 23, 1982. The disclosure of this U.S. patent is expressly incorporated herein by reference.

Bowen et al discloses a positive handshake between a mobile radio transceiver originating a call and a repeater operating on a vacant channel. A mobile transceiver desirous of originating a transmission searches a plurality of channels for an idle channel (indicated by the absence of a busy signal or tone which repeaters transmit on channels in use). When the mobile transceiver locates an idle channel, it transmits a busy signal burst which is received by the repeater operating on the idle channel. The repeater, upon detecting the busy signal burst transmitted by the mobile transceiver, transmits an acquisition signal burst which preferably has characteristics which are different from those of the busy signal. The acquisition signal burst is transmitted only if the channel is in fact vacant.

The Bowen et al type mobile transceiver originating the transmission listens for the acquisition signal, and completes a predetermined channel acquisition signalling sequence only after detecting the acquisition signal burst returned from the repeater. If the acquisition signal burst is detected, the mobile station then transmits a call signalling sequence including a first tone followed by a second tone (i.e. a "group signal" or "collect" tone followed by a "sub-group signal") which collectively identify a particular mobile transceiver (or a group of mobile transceivers) with which the user would like to communicate.

The repeater in the Bowen et al system receives and re-transmits the calling sequence to alert other designated mobile transceivers (which if in an "idle" mode are continuously scanning the repeater channels to detect call signalling sequences pre-assigned to them) identified by the transmitted signalling sequence that communication is to be established. The repeater simultaneously transmits a busy signal throughout the channel acquisition call signalling sequence (beginning at the time that a busy signal transmitted by the mobile station is received by the repeater) to ensure that other mobile transceivers searching for an idle channel detect that the channel is in use and therefore do not try to acquire the channel themselves.

When the Bowen et al mobile transceiver has completed transmitting the desired call signalling sequence, it switches back to a receive mode to listen for a busy signal still being transmitted by the repeater. If such a busy signal is still present, the mobile transceiver assumes that the communication channel has been successfully acquired and dedicated to its use, and begins operating in a "ready" mode. The radio transceiver is available for use by a user to communicate voice information over the acquired communication channel via the repeater to another mobile transceiver(s) alerted by the call signalling sequence and "collected" onto the channel. On the other hand, if the mobile transceiver does not detect a busy signal at the conclusion of its call signalling transmission, it resumes scanning the communication channels until another idle channel is found, and attempts to acquire this idle channel in the same manner.

An improved arrangement is disclosed in U.S. application Ser. No. 721,815 filed Apr. 10, 1985. Briefly, this improved arrangement includes additional signalling tones and suppresses transmission of the busy signal during portions of the call signalling sequence to permit a larger number of different groups of mobile transceivers to be served by a single group of repeaters while reducing the possibility of a mobile transceiver "falsing" on voice information present on a scanned communication channel.

Other radio communications systems are disclosed in the following commonly-assigned patents: U.S. Pat. No. 4,347,625 to Williams issued on Aug. 31, 1982 entitled "Arrangement For Cellular Operation Of A Repeater Trunking System"; U.S. Pat. No. 4,409,687 to Berti et al issued on Oct. 11, 1983 entitled "Arrangement And Method For Establishing Radio Communication In A System"; U.S. Pat. No. 4,281,413 to Forrest issued July 28, 1981 entitled "Multichannel Radio Telephone System"; and U.S. Pat. No. 4,376,310 to Stackhouse et al entitled "Mobile Data Terminal Channel Busy Arrangement" issued Mar. 8, 1983.

The following U.S. patents disclose techniques for routing and/or transferring a call from one repeater in a cellular mobile radiotelephone communications system to another depending upon the physical location of a mobile transceiver participating in the call:

U.S. Pat. No. 4,187,398 to Stark (1980);
U.S. Pat. No. 4,228,319 to De Jager et al (1980);
U.S. Pat. No. 4,398,063 to Hass et al (1983);
U.S. Pat. No. 4,475,010 to Huensch et al (1984);
U.S. Pat. No. 4,144,496 to Cunningham et al (1979);
U.S. Pat. No. 4,435,840 to Kojima et al (1984);
U.S. Pat. No. 4,127,744 to Yoshikawa et al (1978);
U.S. Pat. No. 4,144,412 to Ito et al (1979);
U.S. Pat. No. 4,242,538 to Ito et al (1980);
U.S. Pat. No. 4,308,429 to Kai et al (1981);
U.S. Pat. No. 3,764,915 to Cox et al (1973);
U.S. Pat. No. 3,663,762 to Joel, Jr. (1972);
U.S. Pat. No. 4,144,411 to Frenkiel (1979);
U.S. Pat. No. 4,384,362 to Leland (1983); and
U.S. Pat. No. 3,898,390 to Wells et al (1975).

Although the exemplary arrangements disclosed in U.S. Pat. No. 4,360,927 to Bowen et al and in U.S. application Ser. No. 721,815 are quite successful, further improvements are possible (it should be noted that the discussion herein of these systems refers only to the exemplary embodiments thereof and does not relate to the scope of any of the patent claims in the Bowen et al patent or in U.S. patent application Ser. No. 721,815). In both of these systems, it is assumed that all mobile transceivers which are to participate in communications are in the "idle" mode and are scanning the repeater channels at the time a call signalling sequence directed to them is transmitted over a vacant repeater channel, and that all such mobile transceivers enter the "ready" mode and successfully "lock on" to the newly-dedicated repeater channel in response to the call signalling and remain on this dedicated channel until communications has terminated. A mobile transceiver which "drops off" a dedicated channel or which accidentally or intentionally misses the call signalling sequence which dedicates the channel has no way of later joining the ongoing communications on the now-dedicated channel.

Suppose, for example, that a repeater channel has been acquired by a group of several mobile transceivers (in the manner described previously), and that one of the mobile transceivers in the group temporarily cannot receive the repeater transmissions (e.g., the vehicle that it is on board is driven through a tunnel or behind a hill). The mobile transceiver "drops off" the dedicated channel because, not detecting the transmission of a busy signal (or a carrier) for a prefixed time-out period, it determines that communication on the channel has terminated. The mobile transceiver will thus return to the "idle" mode of operation in which it continuously scans repeater channels listening for call signalling.

Typically, the operator of the mobile transceiver which has "dropped off" the channel will try to rejoin the continuing communications by initiating a call signalling sequence (i.e., he or she keys the microphone to cause the transceiver to enter the "wait" mode and attempt to acquire a repeater channel). If no repeater channels are free, the attempt at acquiring a new channel will be unsuccessful. Even if the mobile transceiver successfully acquires a new repeater channel, communications with the other mobile transceivers in the group will not be established—these other transceivers are still engaged in communications on the original channel, and the calling mobile transceiver has now acquired a different channel. Two repeater channels have been dedicated to the same group of mobile transceivers, and all of the transceivers in the group are nevertheless unable to communicate with one another.

If one of the operators of a mobile transceiver in the same group as the transceiver which "dropped off" the channel realizes that the operator to whom he or she was conversing is no longer present on the channel, the operators of the transceivers still present on the channel may decide to intentionally terminate communications on the dedicated channel and to attempt to acquire a new repeater channel (so that the transceiver which "dropped off" the channel can be "collected" onto a new channel). If, however, the mobile transceiver which had originally "dropped off" the channel has already acquired a new channel, that transceiver will no longer be in the "idle" mode scanning repeater channels waiting for a call and will not detect the new call signalling sequence. These events can occur several times before all of the mobile transceivers in the group are finally collected onto the same repeater channel, causing inefficient use of repeater channels, waste of time, and frustration of mobile transceiver operators.

In many systems, it is desirable to permit mobile transceivers to be included in more than one group of transceivers. For example, the transceiver of a supervisor or a dispatcher may be programmed to enable him or her to call the transceivers of all employees (employee transceivers may be divided into several groups of transceivers), while an employee transceiver may be programmed to permit the employee to contact only a single group of transceivers operated by a subset of fellow employees. Sometimes, therefore, a mobile transceiver included in multiple groups may be busy communicating with transceivers of a first group while a call for a second group (of which the mobile transceiver is also a member) is transmitted by the repeater. Once the communications of the first group have terminated, the mobile transceiver which is also included in the second group may wish to establish communications with the second group of transceivers. Unfortunately, a call signalling sequence directed to the second group of transceivers will not be received by any of them because they are busy participating in communications on a channel already dedicated to the second group.

A similar situation occurs if a mobile transceiver is powered off or is otherwise disabled from receiving repeater transmissions during the time a call signalling sequence directed to a group of which it is a member is transmitted by the repeater. It would be highly desirable to provide some way for a mobile transceiver not participating in communications on a repeater channel dedicated to its own group of mobile transceivers to selectively join the ongoing communications at will.

Systems which use data streams to direct mobile transceivers to channels (see, e.g., the systems disclosed in U.S. Pat. No. 4,352,955 to Kai et al and U.S. Pat. No. 4,127,744 to Yoshikawa et al) have an acceptable solution to this problem despite the limitations imposed by the solution. Any time a mobile transceiver in such systems is not involved in voice communications on a repeater channel, the mobile transceiver monitors a data stream transmitted continuously by the repeater over a dedicated control channel. If a mobile station "drops off" a channel prematurely, the data stream transmitted on the control channel redirects the mobile station back onto the correct repeater channel.

There are serious disadvantages to this data stream approach, however. A mobile transceiver can never intentionally exit a conversation to make or receive another call on a different channel, since the data stream always forces the mobile transceiver to rejoin the conversation. Moreover, in systems in which the data stream is transmitted over a dedicated control channel, the number of channels available for voice communications is decreased by one. One of the many advantages of the systems disclosed in U.S. Pat. No. 4,360,927 to Bowen et al and in application Ser. No. 721,815 is that no dedicated control channel is needed and all available channels can be used for voice communications. It is wasteful to permanently allocate a channel for transmission of the data stream unless there are so great an abundance of voice channels that a channel is always free. Unfortunately, systems installed in busy metropolitan areas can experience overload during times of peak usage. Moreover, it is often not worth the expense of providing a dedicated control channel and associated equipment (e.g. a transmitter) merely to resolve a problem which arises only occasionally when a mobile transceiver "drops off" a channel prematurely.

The present invention permits a mobile transceiver to join, at will, communications occurring on a repeater channel after the repeater channel has been dedicated without requiring a control channel. A group of mobile transceivers scans plural communications channels waiting for a call signalling sequence directed to the group. When such a call signalling sequence is transmitted over one of the channels, the group of transceivers are collected onto the channel and communications are permitted between the transceivers.

When a further transceiver of the group not participating in communications over the channel dedicated to the group is to join (or rejoin) the ongoing communications, the transceiver transmits call signalling over a channel different from the dedicated channel. A repeater operating on this different channel decides, in response to the call signalling transmitted by the further transceiver, whether the further transceiver should join the ongoing communications permitted over the first channel. If the further radio transceiver is to join the ongoing communications, the repeater causes the further transceiver to begin scanning the communications channels and simultaneously, interrupts the ongoing communication and transmits a call signalling sequence over the already-dedicated channel. The scanning mobile transceiver receives the call signalling sequence transmitted over the already-dedicated channel and joins the communications being conducted thereon.

In an exemplary system in accordance with the present invention, an operator of a mobile or portable radio transceiver is free to decide whether or not the transceiver is to remain tuned to a channel dedicated to a group of transceivers of which his or her transceiver is a member. The operator may choose to simply drop off the channel and not participate further in communications thereon, or drop off the channel in order to communicate with a different group of radio transceivers. The operator is free to rejoin the ongoing communications on the channel later by simply initiating a call on an unused channel. Cooperation between repeaters automatically causes the operator's radio transceiver to drop off the channel upon which the call is being initiated, to begin scanning the communications channels, and to be collected onto the repeater channel already dedicated to the group of which the transceiver is a member.

Thus, an operator can intentionally "drop off" a channel without being forced back on. If a mobile transceiver accidentally "drops off" a channel, the operator of the transceiver has the option of deciding whether or not to rejoin the conversation. Although a free repeater channel is necessary for a join to occur, a channel does not have to be permanently allocated for, and dedicated to, implementing the join feature. Since the need for a join does not arise frequently enough to justify allocating a control channel especially for this feature, available resources (i.e., equipment and radio channels) are used more efficiently. Moreover, the call signalling used to cause a mobile transceiver to join an existing conversation serves as an alert to the operators of mobile transceivers already operating on the dedicated channel that one or more transceivers have just been joined and are now also operating on the channel.

The present invention is fully compatible with both the earlier Bowen et al system described in U.S. Pat. No. 4,360,927 and with the improved system described in application Ser. No. 721,815 (although, of course, the invention can be used with advantageous results in other trunking communications systems as well). All changes to existing systems are made in the preferred embodiment by simply reprogramming the repeater, and do not require modification of the many mobile transceivers that may already be out in the field.

BRIEF DESCRIPTION OF THE DRAWINGS

Many of the additional advantages and features of the present invention will be more readily apparent and better understood by reference to the following detailed description of exemplary embodiments considered in conjunction with the accompanying drawings, of which:

FIG. 2 is a graphical illustration of the various operating modes of the mobile transceivers shown in FIG. 1;

FIGS. 3A and 3B are together a graphical illustration of exemplary signalling events occurring in accordance with the present invention when a mobile transceiver joins ongoing communications on an already-dedicated repeater channel;

FIG. 4 is a block diagram of an exemplary repeater station in accordance with the present invention;

FIG. 5 is a schematic block diagram of the site controller shown in FIG. 4;

FIG. 8 is a detailed flow chart of an exemplary "mobile call processing routine" called by the main routine shown in FIG. 7;

FIG. 10 is an exemplary program control flow chart of a main routine performed by the transceiver shown in FIG. 6;

DETAILED DESCRIPTION OF THE PREFERRED EMBODIMENT

Figure 1:
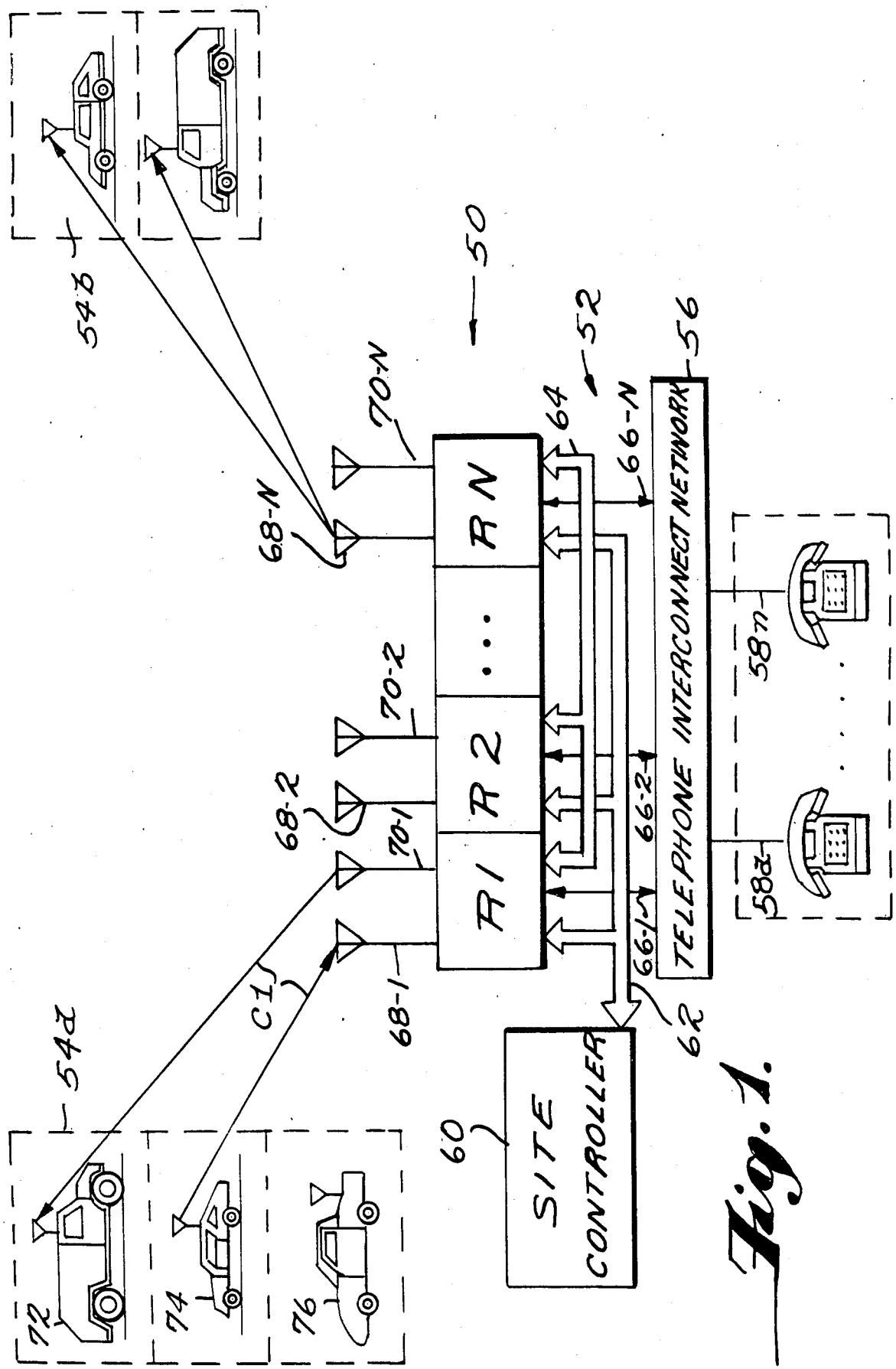
FIG. 1 is a general block diagram of an exemplary trunking radio communications system according to the present invention.

FIG. 1 is a schematic block diagram of a presently preferred exemplary embodiment of a trunking radio communications system 50 in accordance with the present invention. System 50 includes a repeater base station 52 and plural groups 54a–54n of mobile radio transceivers (only two groups 54a and 54b of transceivers are shown, but any number of groups of transceivers can be provided). Repeater base station 52 is connected via a telephone interconnect network 56 to one or more conventional standard telephone lines 58a–58n ("land lines") which are used to establish communications between standard telephones and mobile transceivers.

Repeater base station 52 includes a plurality of individual repeater transceivers R1–RN, a site controller 60, a data communications bus 62 (connecting the site controller to the repeater transceivers), and in some implementations may also have a further data communications bus 64 (connecting the repeater transceivers to one another). Each repeater transceiver R1–RN is capable of communicating with site controller 60 via data bus 62, and is also capable of communicating directly with any other repeater transceiver via data bus 64.

Repeater transceivers R1–RN are each connected to telephone interconnect network 56 via an analog signal path (66-1 through 66-N, respectively). Each repeater R1–RN is also connected to a transmit antenna (68-1 through 68-N, respectively) and to a receive antenna (70-1 through 70-N, respectively).

Repeaters R1 through RN each permit radio transceivers within a group 54 of transceivers to communicate with one another over a communications channel. Groups 54a–54n of mobile transceivers each include at least one mobile radio transceiver, and may each include two or more transceivers (the transceivers need not be mobile, of course, but might be portable or fixed in position). Repeaters R1–RN operate independently on different communications channels, so that as many groups of mobile radio transceivers can communicate simultaneously (without interference from the communications of other groups and without intrusion by transceivers in other groups) as there are repeater transceivers.

Repeaters R1–RN are full duplex transceivers in the preferred embodiment (meaning that they each can transmit and receive simultaneously). Conventional techniques for sufficiently separating the input and output frequencies of repeater transceivers R1 through RN and the use of filtering and other techniques permit the repeater transceivers to operate simultaneously on different frequencies on a non-interfering basis.

Typically, each group 54a through 54n of mobile radio transceivers has a common basis. For example, mobile radio transceivers installed on all vehicles owned by a given business may be included in the same group. Communications are generally restricted within each group (i.e. any member of a group of radio transceivers may communicate with any other member of the same group, but communications between members of different groups is not possible). A given mobile transceiver may be a member of more than one group if desired. Each group is pre-assigned a predetermined call signalling sequence, which in the preferred embodiment is a sequence of two tones or four tones uniquely identifying the group. The call signalling sequence is used to call ("collect") every member of a group onto a communications channel corresponding to one of repeater transceivers R1 through RN.

Briefly, the mobile transceivers supported by repeater base station 52 continuously scan through the communication channels on which repeater transceivers R1 through RN operate whenever the mobile transceivers are not engaged in communications in order that they may detect calls directed to them. If the operator of a mobile transceiver wishes to contact another mobile transceiver in his or her group, the operator controls his or her mobile transceiver to locate an unused communication channel and to transmit to the repeater transceiver operating on that unused channel the call signalling sequence associated with the group of transceivers to be contacted. The repeater transceiver operating on the unused channel receives the call signalling sequence (transmitted on its input frequency) and requests site controller 60 to verify that the received call signalling sequence is valid.

If the call signalling sequence is valid, the repeater regenerates (or repeats) and transmits on its output frequency a version of the call signalling sequence it has just received. The other mobile radio transceivers in the group are normally scanning the communications channel of system 50, and therefore detect and decode the call signalling sequence being transmitted by the repeater. Each mobile radio transceiver in the group "decides" that the call signalling sequence transmitted by the repeater is directed to it, "locks on" to the communications channel over which the call signalling sequence is being transmitted, and begins communicating over the communications channel. In this way, a free communications channel (and thus a free repeater transceiver as well) is "acquired" by (and is temporarily dedicated to) a group of mobile radio transceivers and all of the transceivers in the group are "collected" onto the acquired channel. Further description of the handshaking and call signalling sequence protocol used in the preferred embodiment may be found in application Ser. No. 721,815.

In an alternate mode of operation, system 50 can be used to establish communications between a land line and a group of mobile radio transceivers. Someone who wishes to contact a group of mobile transceivers simply calls a standard pre-assigned telephone number corresponding to telephone interconnect network 56. Telephone interconnect network 56 automatically "answers" the call by taking the telephone line "off hook" and requests the telephone caller to dial (using, e.g., a touchtone keypad) additional digits specifying a code representing a group of mobile radio transceivers to be contacted, and also determines whether there is a free repeater and associated communications channel.

If there are no free channels, the telephone interconnect network doesn't answer the telephone. If a free channel is or becomes available, telephone interconnect network 56 connects the telephone line to the repeater transceiver operating on that free channel. The repeater operating on the free channel transmits the call signalling sequence described above corresponding to the group of mobile radio transceivers to be contacted (as specified by the landline caller's request). The mobile radio transceivers to be contacted normally will be scanning the repeater channels listening for a call signalling sequence directed to them. All of the mobile radio transceivers in the desired group are collected onto the vacant communications channel in response to the transmitted call signalling sequence, and the repeater transceiver permits communications to take place between the landline caller and the radio transceiver operators.

FIG. 2 is a pictorial diagram indicating the various modes of operation of an exemplary mobile radio transceiver of the preferred embodiment. A mobile radio transceiver in the preferred embodiment operates at any given time in one of three functional modes (states); "idle"; "wait"; and "ready." When power is initially applied to a mobile radio transceiver, the transceiver is placed in the "idle" mode. In the idle mode, the transceiver continuously scans the repeater communications channels (the channels upon which repeater transceivers R1 through RN operate) listening for a call signalling sequence identifying the group of transceivers with which the transceiver is associated. All audio circuits of the mobile transceiver are inhibited in the "idle" mode so that the operator is undisturbed and so that ongoing conversations between transceivers of other groups remain private.

A call signalling sequence in the preferred embodiment is a sequence of tone bursts identifying a group of transceivers being called. If a call signalling sequence received and decoded by a mobile transceiver is a sequence assigned to a group of transceivers of which the receiving transceiver is a member (i.e., if the transceiver has been preprogrammed to recognize the call signalling sequence as a call directed to it), the radio transceiver begins operating in the "ready" mode. In the "ready" mode, the radio transceiver locks onto the channel over which the received call signalling sequence is transmitted and is ready to participate in voice communications on that channel. The audio circuits of the radio transceiver are enabled and an indicator lamp (not shown) is illuminated. An audible alarm (such as four alert beeps) is sounded by the radio transceiver upon entry into the "ready" mode so as to alert an operator that a call has been received.

If the repeater which caused the mobile transceiver to lock onto the channel ceases transmitting or communication is otherwise interrupted, the radio transceiver returns to the "idle" mode from the "ready" mode and resumes searching for calls identifying groups with which it is associated.

From the "idle" mode, if a user desires to originate a call (such as by depressing a push-to-talk button located on, for example, a hand-held microphone), the radio transceiver begins operating in the "wait" mode. In the "wait" mode, the transceiver stops scanning on the "first" vacant (unused) repeater communications channel (in the sequence of channels scanned by the transceiver) and attempts to acquire the corresponding repeater. Channel acquisition signalling protocol may be that described in commonly assigned application Ser. No. 721,815 filed Apr. 10, 1985 or that described in U.S. Pat. No. 4,360,927 to Bowen et al. After all repeater communications channels have been tried without acquiring a repeater after a time-out period has elapsed, the radio transceiver informs the user that no vacant communications channels are available (for example, by sounding an audible tone). If all channels are busy or if the mobile radio transceiver has failed to establish communications with a repeater after a time-out period has elapsed, the radio transceiver returns to the idle mode.

Figure 3B:
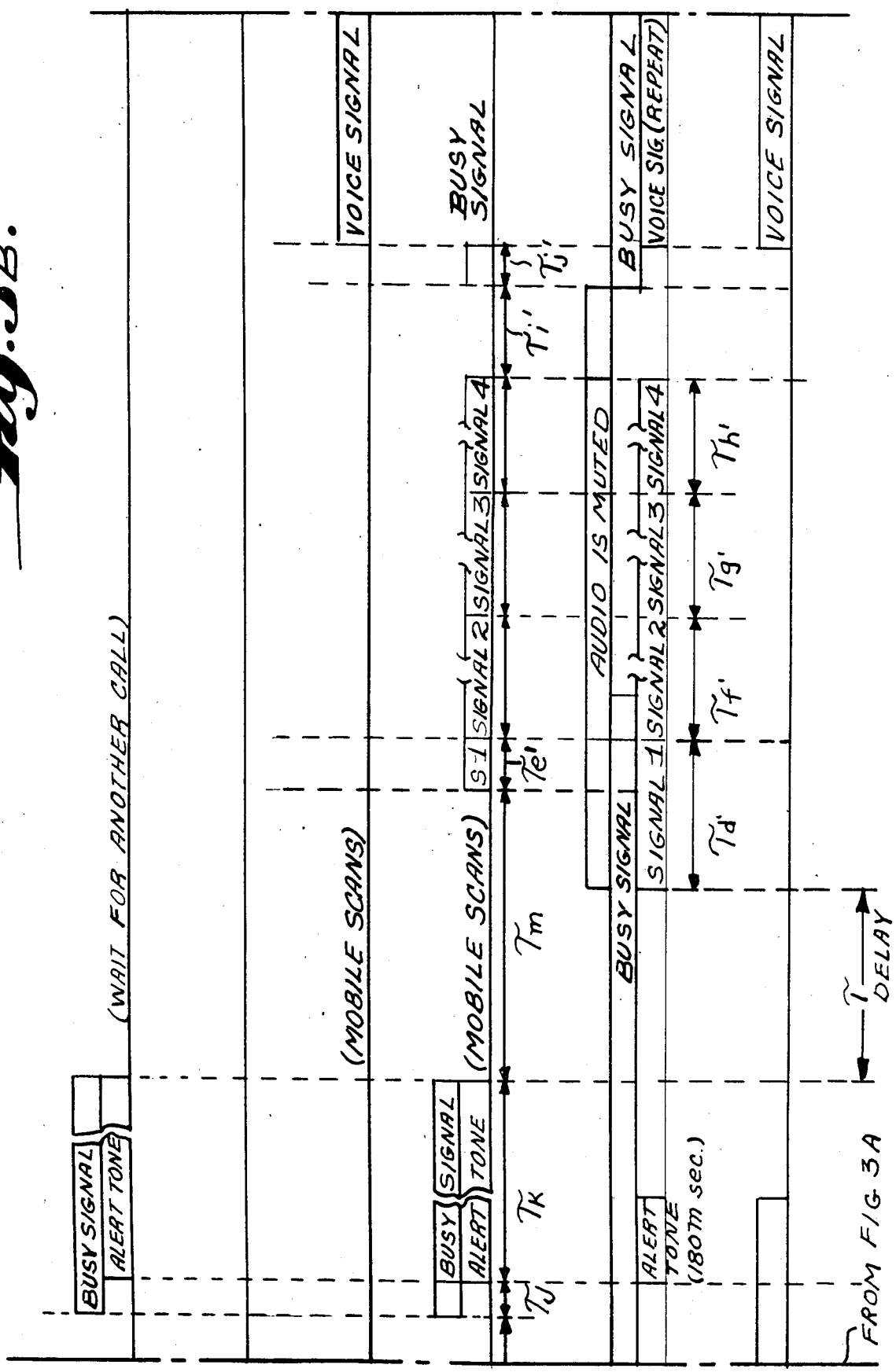

Suppose that a communications channel Y (and, for example, repeater R1 operating on channel Y) has been dedicated to group 54a of mobile radio transceivers, and that group 54a includes mobile transceivers 72, 74 and 76. Suppose further that mobile transceiver 76, for some reason, is not participating in communications on channel Y (e.g., it missed the call signalling sequence originally transmitted on the channel, or it thereafter accidentally or intentionally "dropped off" the channel). Suppose further that the operator of mobile radio transceiver 76 wishes to now join (or rejoin) the communications taking place over repeater channel Y. A graphical illustration of exemplary signalling and handshaking events occurring during a join in accordance with the present invention is shown in FIGS. 3A and 3B.

Prior to attempting to join the communications occurring on repeater channel Y, mobile radio transceiver 76 is in the "idle" mode and is scanning through the repeater channels listening for a call signalling sequence directed to it. The operator of mobile radio transceiver 76 need not join the communications taking place over channel Y, but may instead simply wait for a call. However, as can be seen in FIG. 2, if the operator depresses the microphone button of transceiver 76 (or takes the microphone "off hook"), the transceiver enters the "wait" mode and tries to acquire a free repeater channel.

When transceiver 76 enters the "wait" mode, the receiver section of the mobile radio transceiver is enabled onto a likely channel (e.g., channel X) and "listens" for the presence of a busy signal. If a busy signal is present on the channel (indicating that the channel is presently in use), the mobile transceiver leaves the communications channel and selects another channel. However, if no busy signal is present (interval $\tau_a$ shown in FIG. 3A), the mobile transceiver transmits a busy signal on the channel (during time period $\tau_b$).

The repeater operating on the channel X selected by the mobile radio transceiver (e.g., repeater transceiver R2) receives the busy signal transmitted by the mobile transceiver and verifies that the received signal is in fact a busy signal. The repeater R2 responds to the busy signal by transmitting its own busy signal and simultaneously transmitting an acquisition signal (during time periods $\tau_b$ and $\tau_c$). The acquisition signal transmitted by the repeater continues after the busy signal transmitted by the mobile radio transceiver ceases (i.e. during a time period $\tau_c$) so that when the mobile transceiver is finished transmitting the busy signal, it can switch to the receive mode and determine if the repeater has responded to its busy signal by transmitting an acquisition signal.

If the mobile transceiver does not detect an acquisition signal in response to its transmission of a busy signal, it assumes that the communications channel X which it has selected is unavailable and switches to the next free channel. However, if the mobile transceiver detects an acquisition signal (during time period $\tau_c$) at this time, the mobile transceiver transmits a call signalling sequence which contains information identifying the group of mobile radio transceivers which the mobile transceiver desires to call and communicate with ($\tau_d$).

The call signalling sequence transmitted by mobile radio transceiver in the preferred embodiment may be either a two-tone signalling sequence (as described in U.S. Pat. No. 4,360,927 to Bowen et al but not shown in FIGS. 3A and 3B) or a four-tone signalling sequence (as shown in FIGS. 3A and 3B and as described in application Ser. No. 721,815 of Childress et al). The repeater receives the call signalling sequence transmitted by mobile radio transceiver 76 and begins regenerating the sequence and transmitting it over communications channel X (during time periods $\tau_d$-$\tau_h$). Normally, this call signalling sequence being transmitted by the repeater would collect mobile radio transceivers 72 and 74 (and any other transceivers of the group 54a to be contacted) onto communications channel X. However, mobile transceivers 72 and 74 are engaged in voice communications over repeater channel Y (since well before time period $\tau_a$) and are therefore not scanning through the repeater communications channels and do not detect the call signalling sequence. Other mobile radio transceivers and other groups receive and decode the call signalling sequence, but ignore it once they determine that the signalling sequence is not directed to them.

The call signalling sequence transmitted by the repeater will collect any other transceivers of group 54a which are not engaged in communications on channel Y (or on some other channel). Normally, however, all transceivers of the group except the one initiating the call will be "locked onto" channel Y and the call signalling sequence transmitted by the repeater "collects" no mobile transceivers at all (except the one initiating the call).

The call signalling sequence is transmitted by the repeater for a sufficiently long period of time so that mobile radio transceiver 76 can complete transmission of the call signalling sequence and then switch to the receive mode in time to receive ("catch") at least a final portion of the first tone burst and all of the subsequent regenerated tone bursts comprising the call signalling sequence. Mobile radio transceiver 76 may verify that the regenerated call signalling sequence transmitted by the repeater matches the call signalling sequence which it initially transmitted to the repeater. If such a match exists, the mobile radio transceiver simply waits a time period $\tau_i$ during which it does nothing. $\tau_i$ is preferably of a predetermined duration (e.g. 180 milliseconds in the preferred embodiment). During time period $\tau_i$, the repeater transmits neither a busy signal, an acquisition signal nor a tone burst; rather, it transmits only a "dead" (unmodulated) carrier. Time period $\tau_i$ is used to help prevent mobile radio transceivers of the two-tone Bowen et al type from falsing on four-tone type signalling sequences.

Upon conclusion of time period $\tau_i$, the repeater begins transmitting the busy signal once again. The mobile radio transmitter receives the busy signal transmitted by the repeater (during time period $\tau_j$) and recognizes that the signalling sequence is completed and that the communication channel X has been dedicated to it. The mobile transceiver begins operating in the "ready" mode, receives audio transmitted by the repeater, and converts this audio into sound (via a loudspeaker) to be heard by the operator.

Sometime between the end of time period $\tau_d$ and the beginning of time period $\tau_j$, the repeater R2 recognizes that the call signalling transmitted by mobile transceiver 76 is directed to transceivers which are already communicating over channel Y via repeater R1. During a time period $\tau_k$, the repeater R2 transmits an alert tone (at 2614.9 Hz in the preferred embodiment) over channel X which is received by mobile radio transceiver 76 and converted into sound to be heard by the operator of the transceiver. This alert tone is a distinctive audible tone which informs the operator of mobile radio transceiver 76 that the transceiver will not be granted channel X, but that something else (i.e. a join) is about to occur. Simultaneously, a similar alert tone may be transmitted by repeater R1 over repeater channel Y to alert the other transceivers in group 54a that a join is about to occur. In the preferred embodiment, the alert tone transmitted over channel Y has a duration of 18 msec. The alert tone need not be transmitted on channel Y at the same time an alert tone is transmitted on channel X; the channel Y alert tone could, for example, be transmitted during the time period $\tau_{delay}$ to be discussed shortly.

The alert tone is transmitted over channel X by repeater R2 for a predetermined period of time (e.g. 2.16 seconds), and is subsequently discontinued. During the time period ($\tau_k$) for which the alert tone is transmitted, repeater R2 also transmits the busy signal over channel X (since the mobile radio transceiver 76 will drop the channel upon detecting that the busy signal is no longer present). Mobile radio transceiver 76 detects that the busy signal is no longer present, drops channel X and returns to the "idle" mode, and begins scanning the communications channels listening for a call signalling sequence directed to it (during time period $\tau_m$).

Repeater base station 52 waits a predetermined period of time $\tau_{delay}$, during which time it may mute the audio of repeater R1 (so that nothing but a busy signal is being transmitted over communications channel Y) and/or transmit an alert tone. $\tau_{delay}$ is long enough to ensure that mobile radio transceiver 76 has detected the absence of the busy signal on channel X, and has entered the "idle" mode and begun scanning the repeater communications channels. $\tau_{delay}$ in the preferred embodiment is 1.59 seconds in duration if the mobile transceiver initiating the join is of the Bowen et al two-tone type and 1.49 seconds if the mobile transceiver initiating the join is of the four-tone type as disclosed in application Ser. No. 721,815.

When the period $\tau_{delay}$ has elapsed, repeater R1 begins regenerating the same call signalling sequence previously regenerated by repeater R2 during time periods $\tau_d$ through $\tau_h$ (which is also the same call signalling sequence which was initially transmitted over repeater channel Y prior to time period $\tau_a$ in order to originally collect the other radio transceivers 72 and 74 of group 54a). Hence, repeater R1 transmits a four-tone signalling sequence over communications channel Y (during time periods $\tau_{d'}$, $\tau_{f'}$, $\tau_{g'}$ and $\tau_{h'}$) if mobile transceiver 76 is a four-tone type transceiver, or transmits a two-tone call signalling sequence if mobile transceiver 76 is of the two-tone type. Time period $\tau_{d'}$ is long enough so that mobile radio transceiver 76 can scan through the entire sequence of repeater communications channels to reach channel Y, and to subsequently detect (during a time period $\tau_{e'}$) at least the tail end of the first-transmitted tone in the sequence. Mobile transceiver 76 does not treat the call signalling sequence being transmitted by the repeater any differently from any other call, even though the sequence is actually being transmitted in response to the call transmitted by the mobile transceiver shortly before.

When mobile radio transceiver 76 detects the first tone and recognizes it as corresponding to the first tone of call signalling sequence preassigned to it, it pauses on channel Y to listen for the next tone to be transmitted. As repeater R1 continues (and finally finishes) transmitting the call signalling sequence, mobile radio transceiver 76 decodes this sequence and compares the sequence with the sequence assigned to it.

Since the transmitted call signalling sequence matches the call signalling sequence assigned to transceiver 76, the mobile transceiver waits a predetermined period of time $\tau_{i'}$, and then determines if a busy signal is transmitted during time period $\tau_{j'}$. Repeater R1 begins transmitting the busy signal during time period $\tau_{j'}$ (transmission of the busy signal having been interrupted during a portion of time period $\tau_f$ and during time periods $\tau_{g'}$, $\tau_{h'}$ and $\tau_{i'}$ to prevent falsing as is discussed in application Ser. No. 721,815), and mobile radio transceiver 76 detects that transmission of the busy signal has been resumed. Mobile radio transceiver 76 then begins operating in the "ready" mode, alerts the operator that an incoming call has arrived, and is ready to be used for voice communications with the other members of group 54A.

Through cooperation of two repeater transceivers R1 and R2, repeater base station 52 converts a call initiated by mobile radio transceiver 76 that would ordinarily be interpreted as a request for acquisition of a free channel into a request to join ongoing communications on another channel, and causes mobile radio transceiver 76 to join the ongoing communications. This join occurs in the preferred embodiment without requiring mobile radio transceiver 76 to transmit any signals other than those it uses to initiate a normal call and without requiring any additional intelligence on the part of the mobile transceiver.

Although the preferred embodiment uses a call signalling sequence including two or four tones identifying a group of mobile radio transceivers, the invention is certainly not limited in application to systems using tone signalling protocols. In some applications, it may be highly advantageous to replace tone signalling with digital signalling—and the present invention is equally useful in and adaptable to either type of system.

In a system using digital signalling, "frames" of digital information are transmitted by the repeater instead of (or along with) signalling tones, each "frame" including digital information identifying a group of transceivers being called. A "frame" of digital information comprises a series of pulses encoding a value representing the group of transceivers being called (and may also include timing pulses to permit receivers to synchronously decode the information contained in the frame). Using conventional, presently-available digital data transceiver and encoder/decoder components (see, for example, Tugal, *Data Transmission Analysis, Design, Applications* (McGraw-Hill 1982)), a frame of digital information can be transmitted by a repeater at an extremely rapid rate and received and decoded by mobile transceivers at the same rapid rate.

To ensure that all mobile transceivers in the "idle" mode (and thus scanning the communication channels awaiting a call) receive and decode the digital call signalling sequence transmitted by the repeater, the repeater preferably transmits the same frame of digital signalling information repetitively (e.g., 20 times). Each mobile transceiver can determine whether or not the call is directed to it by decoding a single frame. Thus, a transceiver not being called can determine from a single frame that the call is not directed to it and can thereafter leave the channel being dedicated and resume scanning the channels listening for other calls. A transceiver which is identified by the information contained in the digital frame "locks onto" the channel after decoding the first full frame of digital information it receives, and then preferably remains muted until after the last frame is transmitted (the last frame transmitted may include a flag or other special character which indicates to transceivers being called that signalling is completed and communications can begin), in response to which it may enable its audio circuits.

The higher data transmission rate offered by a digital system gives such systems some advantages over tone-based systems at the expense of requiring each mobile transceiver to be provided with relatively sophisticated (although conventional) digital signal processing components. Because it is often somewhat expensive to retro-fit existing, older tone signalling-type mobile transceivers with digital signal processing components, entirely new installations not requiring compatability with older mobile transceivers already in the field are the best candidates for the digital call signalling sequence arrangements described.

A mobile transceiver which is to join an ongoing conversation on a communications channel of a digital system transmits a digital call signalling sequence (identifying the group of mobile transceivers to be joined) on an unused repeater channel. The repeater transceiver operating on the unused channel forces the calling mobile transceiver to enter the "idle" mode and begin scanning channels in the manner described above in connection with tone signalling systems. Meanwhile, the repeater transceiver operating on the communications channel over which the conversation to be joined is being conducted transmits a digital call signalling sequence which identifies the group (including the calling mobile radio transceiver) of transceivers participating in the ongoing conversation. The calling mobile transceiver pauses on the occupied repeater channel, receives and decodes a frame of digital information identifying it, and in response to the frame, locks onto the occupied channel and joins the ongoing conversation. The join feature is thus essentially independent of the call signalling protocol and mode being used.

FIG. 4 is a block diagram of an exemplary repeater transceiver (e.g., repeater transceiver R1) in accordance with the presently preferred exemplary embodiment of the present invention. In the preferred embodiment, the repeater is capable of operating in the full duplex mode (i.e., it can receive and transmit signals simultaneously).

Receiving antenna 68-1 is coupled to the input of a repeater receiver 106, conventional in design, which receives and demodulates signals received by the receiving antenna. The output of repeater receiver 106 is coupled to an A/D converter 108 which digitizes the output in a conventional fashion. The digitized output produced by A/D converter 108 is applied to an input of a signal processor 110. The output of signal processor 110 is connected to the input of a D/A converter 112 which converts the digital output of the signal processor to an analog signal and applies the analog signal to the input of a repeater transmitter 114. Repeater transmitter 114 produces a radio frequency (rf) carrier signal modulated by the audio information applied to its input, and couples the modulated rf carrier to transmitting antenna 70-1. Transmitting antenna 70-1 radiates this modulated carrier signal in a conventional manner.

Signal processor 110 is connected to a controller processor 116 and a memory 118 via a bidirectional data bus 120. Processor 116, memory 118, and signal processor 110 communicate via data bus 120.

Signal processor 110 selectively generates call signalling information and also digitally filters (and otherwise processes) the output of repeater receiver 106 (as digitized by A/D converter 108). Signal processor 110 can produce a tone and process an audio signal simultaneously in the preferred embodiment.

The output of repeater receiver 106 is also connected to the input of a busy signal filter and detector 122. Busy signal filter and detector 122 is preferably a bandpass filter which produces an output when a busy signal is received by repeater receiver 106. The output of busy signal filter and detector 122 is applied to the input of a sequential controller 124 the function of which is to control the other portions of repeater R1. Busy signal generator 126 is activated by controller processor 116 and sequential controller 124 via gate 128 to apply a busy signal to repeater transmitter 114.

Memory 118 is capable of storing the identification tones of mobile radio transceivers which communicate via the repeater. Thus, memory 118 stores the identification tone signals which are used to acquire the communications channel on which the repeater operates. Memory 118 also stores program control information used to control the operation of controller processor 116.

Controller processor 116 is connected to data buses 62 and 64 (if used), and employs these buses to communicate either directly with another repeater transceiver or with site controller 60 as needed. Information communicated via data buses 62 and/or 64 is used to accomplish the cooperation between repeater transceivers which brings about a join (as described).

Repeater R1 is also connected via an analog signal path 66-1 to telephone interconnect network 56. Audio in analog form produced at the output of repeater receiver 106 can be selectively applied to telephone interconnect network 56 for application to the telephone line of a telephone caller. Similarly, audio received from the telephone line of a caller by telephone interconnect network 56 may be applied directly to the input of repeater transmitter 114 for transmission to a group of mobile radio transceivers. An "interconnect" between repeater R1 and telephone interconnect network 56 is established by closing a double pole single throw (DPST) switch (130a and 130b) under the control of controller processor 116 (and/or interconnect network 56).

A more detailed explanation of the circuitry of the repeater transceiver R1 may be found in the copending application Ser. No. 721,815 filed Apr. 10, 1985.

FIG. 5 is a schematic block diagram of an exemplary site controller 60 shown in FIG. 1. Site controller 60 includes a microprocessor 150, a read only memory (ROM) 152, an input/output (I/O) port 154, a data bus 156, and a random access memory (RAM) 158. I/O port 154 is connected to data bus 62, and thus provides a means by which information can be communicated between selected repeater transceivers R1-RN and site controller 60. ROM 152 contains stored program control information and other data necessary to control microprocessor 150 to perform a sequence of predetermined steps. RAM 158 contains information used by site controller 60 and by repeater transceivers R1 through RN to control the operation of system 50. Microprocessor 150, ROM 152, I/O port 154 and RAM 158 communicate with one another via data bus 156. The internal structures and operating features of each of these components is conventional and well known to those skilled in the art, and further details need not be provided herein.

RAM 158 stores a table 160 containing a plurality of blocks 162 of data relating to the status of repeaters R1 through RN. Thus, block 162(1) stores information relating to the status of repeater R1, block 162(2) stores information relating to the status of repeater R2, and block 162(N) stores information relating to the status of repeater RN. The contents of blocks 162 are updated periodically as the status of the repeaters to which they relate changes.

Blocks 162 each include the following storage locations: a busy flag; a group field; and an interconnect flag. An index field specifying the repeater and/or communications channel to which the block relates may also be provided and/or other conventional techniques for indexing these blocks may be used. The busy flag of a block 162 is set whenever the repeater it relates to has dedicated the communications channel it operates upon to a group of mobile radio transceivers, and is otherwise unset. When a repeater dedicates a communications channel to a particular group of mobile radio transceivers, a code designating that group (the same code preferably also specifying the call signalling sequence associated with the group) is written into the group field of the block 162 associated with that repeater. The interconnect flag of a block 162 is set whenever the repeater associated therewith is interconnected with a land line via telephone interconnect network 56, and is otherwise unset.

RAM 158 also stores a "validity" table 164 which includes a listing of all of the groups of mobile radio transceivers supported by system 50, and a valid flag associated with the listing of each group. Validity table 164 permits site controller 60 to restrict the use of system 50 to groups of mobile radio transceivers which have been declared to be "valid" on the system. Typically, only a limited number of all possible call signalling sequences are assigned to groups of mobile radio transceivers supported by system 50, and only the assigned groups are listed in validity table 164. Moreover, it is sometimes desirable to deny a group of mobile radio transceivers listed in validity table 164 the use of system 50. For example, a group of users which have contracted to pay for the use of system 50 but which has been delinquent in paying for radio services may be prevented from accessing the system by simply changing the value of the valid flag associated with the listing for this group from "valid" to "invalid."

The manner in which the information stored in tables 160 and 164 is manipulated and changed will be discussed shortly in connection with FIGS. 7 through 13.

Figure 6:
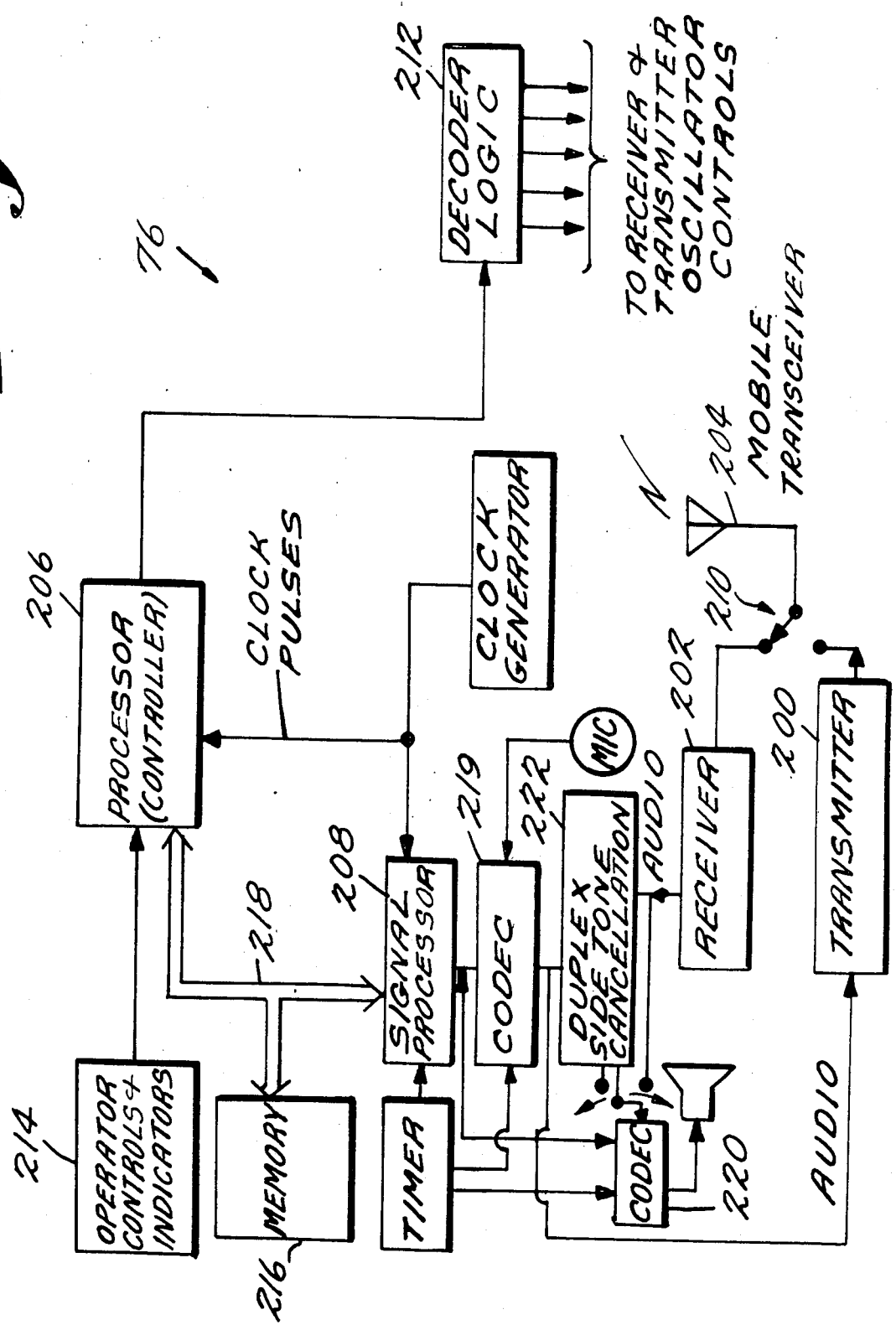
FIG. 6 is a schematic block diagram of an exemplary mobile transceiver in accordance with the present invention.

FIG. 6 is a block diagram of an exemplary mobile radio transceiver (e.g. transceiver 76) in accordance with the present invention. Mobile transceiver 76 includes a transmitter 200, a receiver 202, an antenna 204, a processor 206 and a signal processor 208. Receiver 202 and transmitter 200 are capable of operating on any of the communications channels operated upon by repeaters R1 through RN shown in FIG. 1. Antenna 204 may be switched by a T-R switch 210 (or some other suitable switching device) between transmitter 200 and receiver 202 depending upon whether the radio transceiver is transmitting or receiving (in some systems, it may be desirable to permit the mobile transceiver to operate full duplex rather than half duplex as described).

In the preferred embodiment, receiver 202 and transmitter 200 are frequency modulation devices (although they may be modulated using other conventional methods such as amplitude modulation if desired). Transmitter 200 includes a conventional oscillator circuit (not shown) which operates at any selected one of the input frequencies of repeaters R1 through RN depending upon the signal applied to it by a decoder logic block 212. Receiver 202 is preferably of the superheterodyne type and includes a local oscillator which operates at a selected frequency corresponding to any one of the output frequencies of repeaters R1 through RN depending upon a signal applied to it by decoder logic 212.

Decoder logic 212 is connected to an output of processor 206, which monitors and controls the state of radio transceiver 76 and also controls the operation of signal processor 208. Processor 206 applies control signals to decoder logic 212 which cause the decoder logic to sequentially produce frequency scanning signals. These scanning signals are applied to the oscillators of transmitter 200 and receiver 202 to cause the receiver and transmitter to sequentially operate on the preassigned communications channels provided by repeater base station 52. Decoder logic 212 can comprise a sequential machine which is simply enabled or disabled by processor 206, or the processor can directly control the oscillator frequencies of receiver 202 and transmitter 200 by writing information to digital data input ports of the receiver and the transmitter.

Transceiver 76 includes operator controls and indicators 214 which enable a user to operate the mobile station and to receive indications of the status of the station. The user controls permit the operator to place his or her station in one of the modes depicted in FIG. 2.

The heart of mobile radio transceiver 76 is processor 206 and signal processor 208 and the interaction between these two blocks. Processor 206, signal processor 208 and a memory 216 (e.g., a "personality"-defining PROM storing one or more call signalling sequences pre-assigned to the transceiver) communicate with one another over a conventional bi-directional data bus 218. Processor 206 writes information to signal processor 208 and reads information from the signal processor via data bus 218. Processor 206 may read (and write) information from (to) memory 216 via data bus 218. If desired, an additional address bus (not shown) may be used by processor 206 to address specific locations in memory 216 and specific control registers of signal processor 208.

Transceiver 76 also includes CODECs 219 and 220 and a duplex side tone cancellation circuit 222. The operation of CODECs 219 and 220 and duplex side tone cancellation circuit 222 is believed to be known to those skilled in the art, and need not be presented in detail here. In the conventional architecture shown, each of CODECs 219 and 220 may at times function as A/D and D/A converters in a well known manner.

Signal processor 208 in the preferred embodiment is a conventional large-scale integration (LSI) general-purpose programmable signal-processing device capable of performing a wide variety of tone generation and filtering functions. Signal processor 208 performs all necessary filtering of signals being transmitted and received. Signal processor 208 also detects and/or generates one of 38 possible tones at frequencies, times and durations specified by processor 206. Signal processor 208 is also used to detect and/or generate tones for signalling applications other than those associated with the call signalling between the mobile radio transceiver 76 and a repeater transceiver (such as for touch-tone dialing onto one of standard land lines 58A-58N, for billing purposes, and for other information transmittal to increase security of transmissions and the like).

A more detailed explanation of the operation of the mobile radio transceiver is presented in copending application Ser. No. 721,815 filed Apr. 10, 1985.

Figure 7:
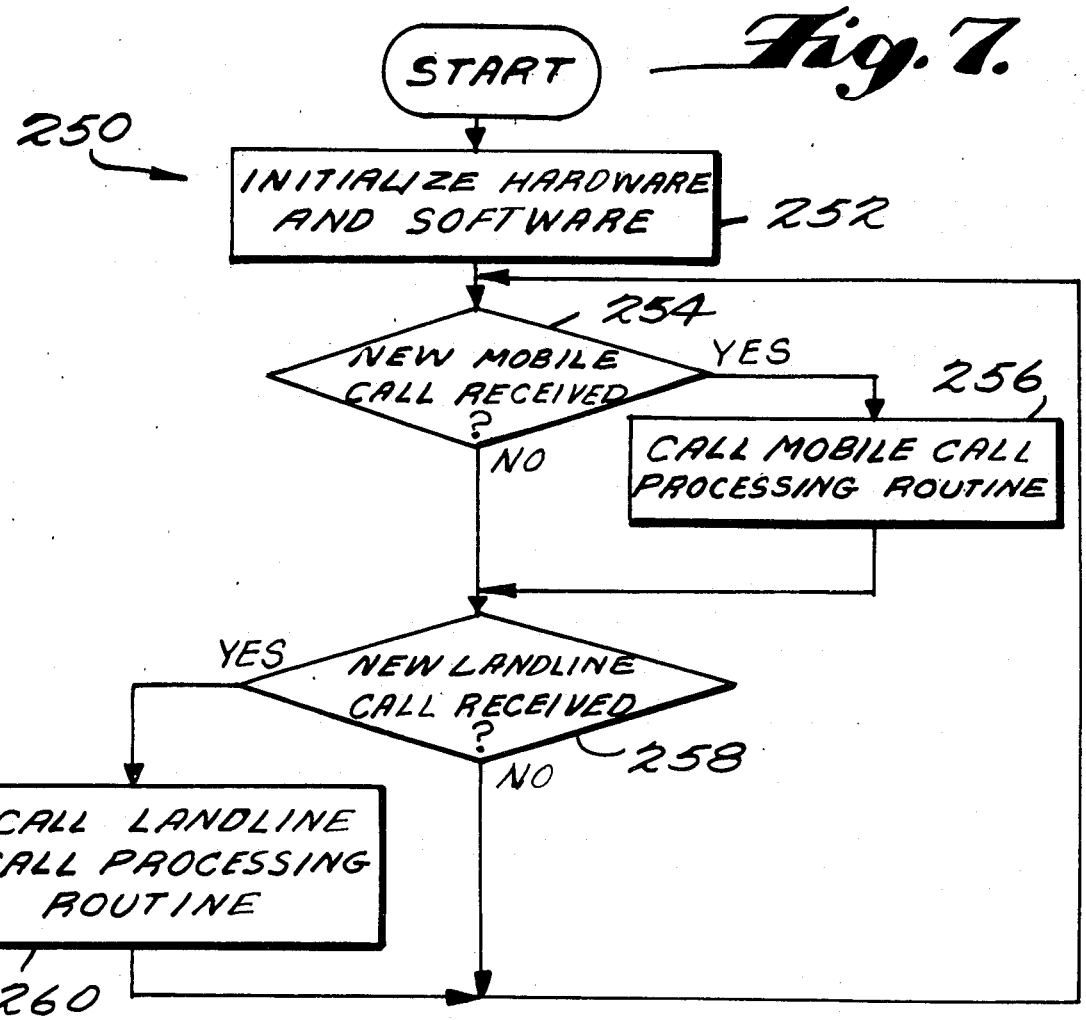
FIG. 7 is an exemplary program control flow chart of a main routine executed by the repeater station shown in FIG. 4 to provide the join feature in accordance with the present invention.

FIG. 7 is a flow chart of a main routine 250 performed by the repeater base station 52 shown in FIG. 4. Main routine 250 is interrupt driven, and is executed whenever the repeater base station is called upon to handle a call (initiated either by a calling mobile radio transceiver or by a land line caller). The processing of main routine 250 is distributed between one or more of repeater transceivers R1-RN and site controller 60 in the preferred embodiment, with most steps being performed by the repeater transceivers. Several versions of main routine 250 may be performed concurrently by different ones of repeater transceivers R1-RN in the preferred embodiment.

Figure 13:
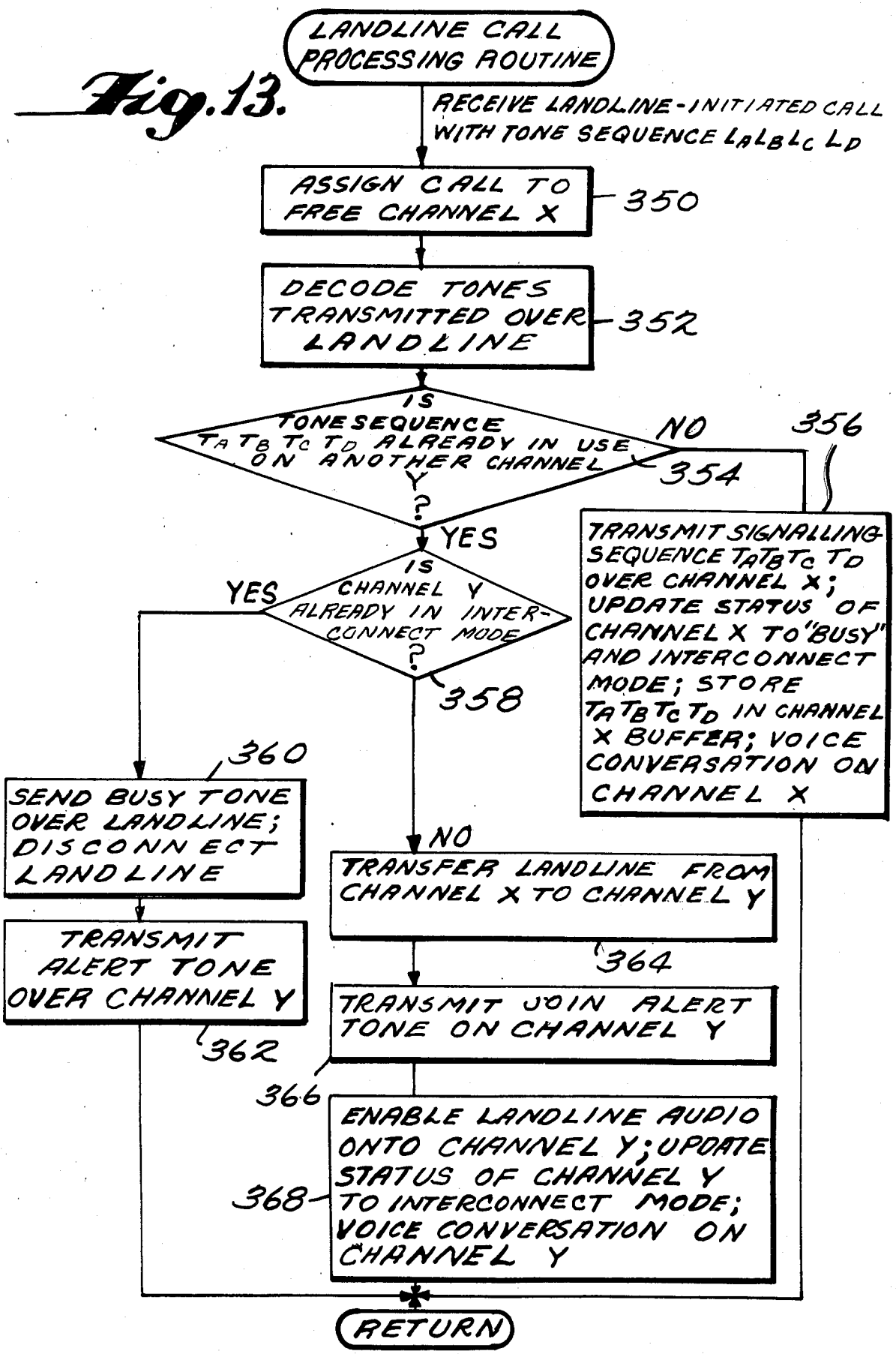
FIG. 13 is a detailed flow chart of an exemplary "land line call processing routine" called by the main routine shown in FIG. 7.

When main routine 250 begins executing, the first step to be performed is that the hardware and software of the repeater transceiver is initialized (block 252). Next, the repeater transceiver determines whether a new mobile call has been received (e.g. by determining whether a busy signal is being received) (block 254). If a new mobile call has been received, the mobile call processing routine shown in FIG. 8 is executed (block 256). If a new mobile call has not been received, the repeater determines whether a new land line call has been received (block 258). If a new land line call has been received, the "land line call processing routine" shown in FIG. 13 is called and executed (block 260). Otherwise, execution of main routine 250 continues to loop until an event occurs due to a new call being originated.

FIG. 8 is a flow chart of the "mobile call processing routine" 300 called by block 256 shown in FIG. 7. Mobile call processing routine 300 controls one of repeater transceivers R1-RN to dedicate a channel to a calling mobile transceiver, and also performs the join feature if necessary. For purposes of the discussion herein, assume that a mobile call originated by mobile transceiver 76 has been received on channel X including the four-tone call signalling sequence $t_a t_b t_c t_d$.

The repeater decodes the call signalling sequence transmitted by the calling mobile radio transceiver, and begins retransmitting the signalling sequence on channel X (as is shown in FIG. 3A) (block 302). Meanwhile, the repeater determines whether the call signalling tone sequence $t_a t_b t_c t_d$ was used to initiate communications on another channel which are still ongoing (decision block 304). Decision block 304 is performed in the preferred embodiment by sending a packet of information representing the received and decoded call signalling sequence to site controller 60 via data bus 62 with a request for validation (the form of such a validation request message might be "$O t_a t_b t_c t_d$" where "O" is a "request for validation" character and "$t_a t_b t_c t_d$" specifies the tones in the call signalling sequence to be validated).

Regardless of the result of the test performed by decision block 304, the repeater finishes transmitting the call signalling sequence on channel X. Site controller 60 meanwhile indexes the entry in validation table 164 corresponding to the call signalling sequence $t_a t_b t_c t_d$ and also checks the group fields of each of blocks 162 to determine if this information has been stored in the group field of the block corresponding to any other repeater of system 50. Site controller 60 returns information to the repeater which indicates whether: (1) the call signalling sequence is valid; and (2) the group identified by call signalling sequence is communicating on any other repeater communications channel. In the preferred embodiment, an invalid user message ("5") is sent by site controller 60 to the repeater R1-RN which requested the validation whenever the sequence is invalid or the group identified by the sequence is communicating on another channel; otherwise, a valid user message "2" is sent by the site controller to the relevant repeater to give the repeater permission to dedicate the free channel X to the calling mobile transceiver. Thus, in the preferred embodiment, decision blocks 304 and 310 are actually performed as one step by site controller 60, and the repeater requesting validation is notified only whether a call signalling sequence is "valid" or "invalid" based upon the combined results of the two tests.

If the call signalling sequence $t_a t_b t_c t_d$ is in use on another channel (e.g. channel Y), the repeater transceiver causes the calling mobile radio transceiver to join the ongoing conversation on that other channel by transmitting an alert tone and dropping the channel (as is shown in FIG. 3B) (block 306). Block 308 (which is performed by a *different* repeater transceiver, e.g. repeater R1, than the one performing block 306 and may be performed concurrently with block 306) transmits the join tone sequence shown in FIG. 3B on channel Y (the channel already in use by members of the group identified by the call signalling sequence received on channel X). Block 308 is initiated by transmitting a message from site controller 60 to the repeater operating on the already-dedicated channel Y (in the preferred embodiment, this message has the form "$Ct_a t_b t_c t_d$" where the character "C" indicates a join) which causes the repeater to transmit a specified signalling sequence on channel Y.

If the call signalling sequence is not already in use on another channel, the calling mobile transceiver is requesting not a join but rather the acquisition of a free channel for use by its group. If the call signalling sequence is invalid (as tested for by block 310 based upon information obtained by site controller 60 from validity table 164), the repeater completes the transmission of the call signalling sequence, sends an alert tone to indicate to the operator of the calling radio transceiver that something is wrong and that he or she has been denied access to system 50, and then drops the channel (block 312).

Even mobile transceivers which are denied acquisition of a channel are temporarily granted access to the channel in the preferred embodiment and are shortly thereafter dropped off the channel when the repeater stops transmitting the busy signal. In the preferred embodiment, if the call signalling sequence transmitted by the repeater was simply terminated as soon as a determination is made that the call signalling sequence is invalid or that a join should be performed, the calling mobile radio transceiver would not necessarily return to the "idle" mode to begin scanning additional channels, but might remain in the "wait" mode and try to acquire another free channel. Because the repeater finishes transmitting the call signalling sequence before it drops the mobile radio transceiver off the channel, the mobile transceiver is guaranteed to return to the "idle" mode, thereby ensuring more efficient use of repeater channels (in the case of an invalid call signalling sequence) and also ensuring that the mobile radio transceiver will receive the join call signalling sequence (in the case of a join).

If decision block 310 determines that the call signalling sequence is valid, site controller 60 updates the block 162 associated with the repeater to reflect that the repeater is busy (by setting the busy flag in the preferred embodiment) and stores a code specifying the call signalling sequence in the group field of the block associated with the repeater (block 314). Meanwhile, the repeater continues regenerating the call signalling sequence it has decoded in order to collect all of the mobile radio transceivers of the corresponding group onto the channel X, and after the signalling sequence has finished, permits voice communications between the collected mobile radio transceivers to occur.

Figure 9:
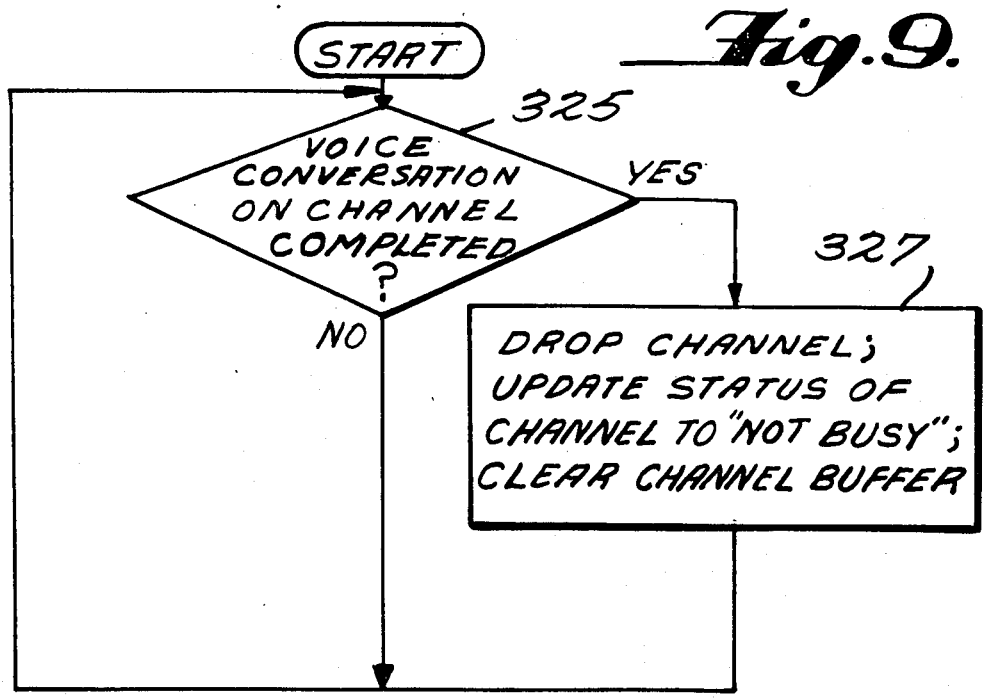
FIG. 9 is a flow chart of another exemplary routine continuously performed by the repeater shown in FIG, 4.

FIG. 9 is a flow chart of a monitor routine continuously performed by each of the repeater transceivers R1 through RN of system 50. Decision block 325 continuously monitors the communications occurring on the repeater communications channel to determine when the communication is completed (by determining when mobile transceiver transmissions are no longer being received). If a predetermined period of time has passed since a mobile radio transceiver transmission was last received, the repeater drops the channel (e.g., by terminating transmission of its carrier), and requests site controller 60 (by sending the message "NBY" to the site controller in the preferred embodiment) to update the status of the communications channel to "not busy" and to clear all information from the block 162 corresponding to the channel (block 327).

Figure 11:
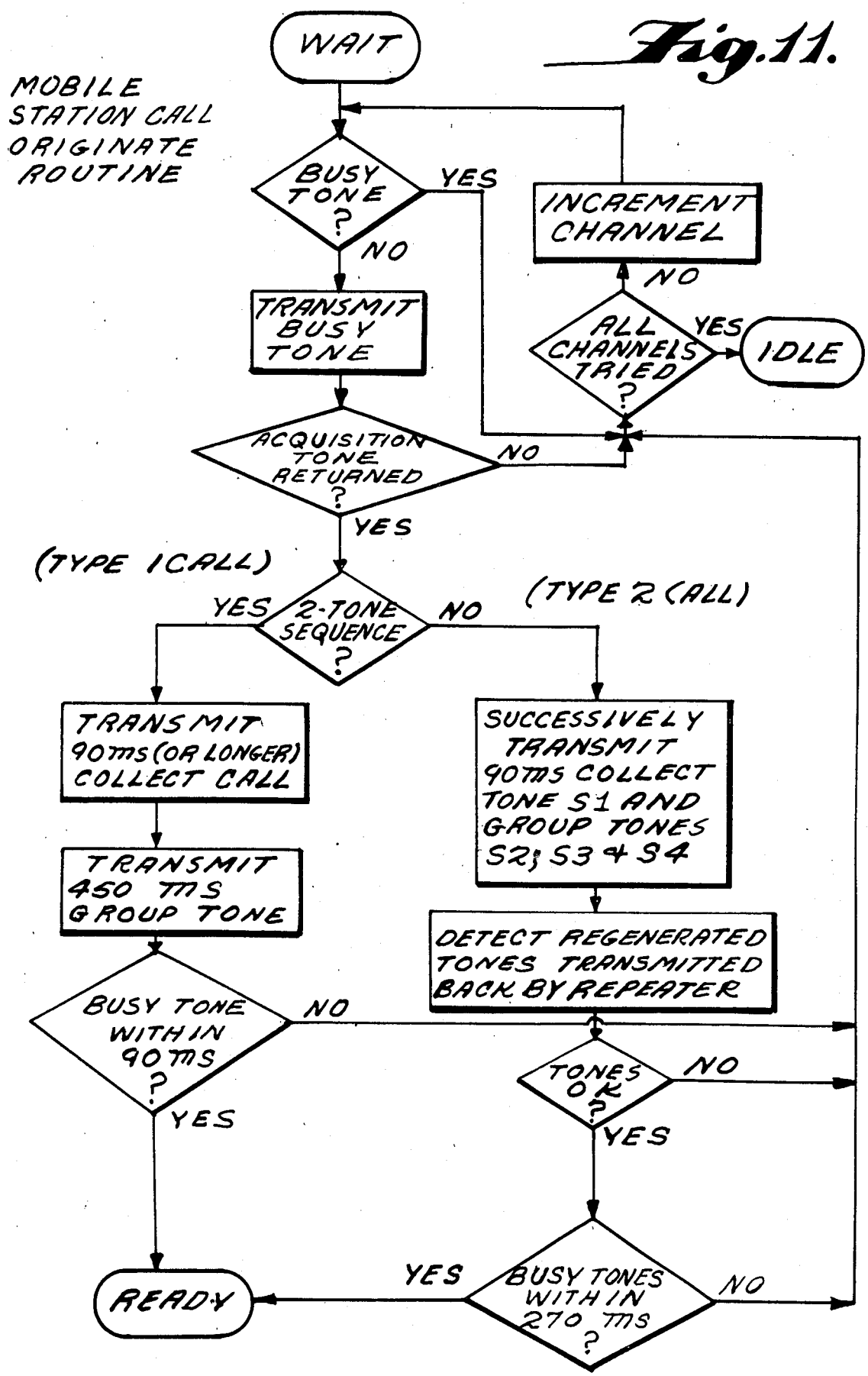
FIG. 11 is an exemplary program control flow chart of a routine performed by the mobile transceiver shown in FIG. 6 during the time it is operating in the "wait" mode.
Figure 12:
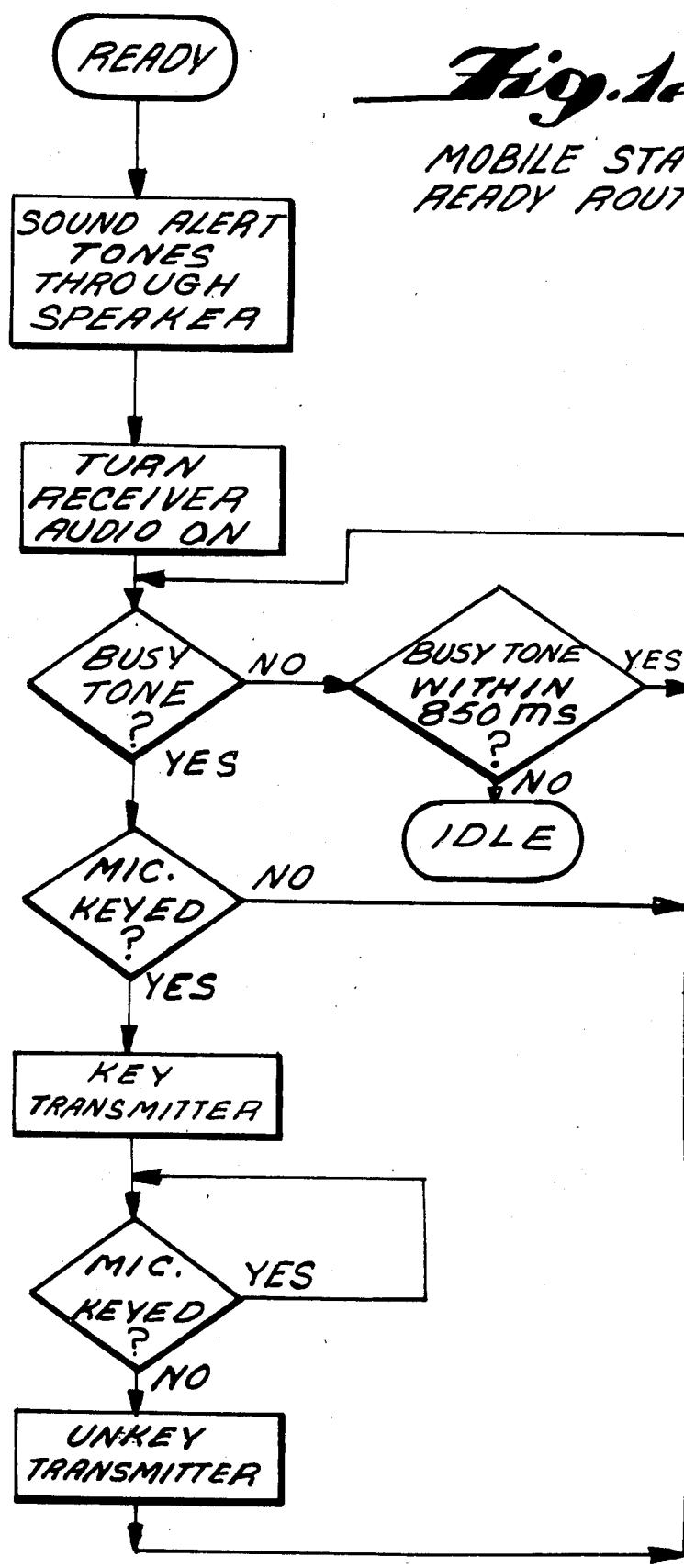
FIG. 12 is an exemplary program control flow chart of a routine performed by the mobile transceiver shown in FIG. 6 when it is operating in the "ready" mode.

FIGS. 10 through 12 are flow charts of the steps performed by each of the mobile radio transceivers of system 50. A detailed discussion of these flow charts is presented in application Ser. No. 725,682 filed Apr. 22, 1985, which discussion is expressly incorporated herein by reference. FIG. 10 is a flow chart of the main routine performed by each mobile radio transceiver of system 50 and will now be described in a manner which will illustrate the behavior of a mobile radio transceiver in the preferred embodiment during a join.

Assume that a mobile radio transceiver is in the "idle" mode and the group of which the transceiver is a member is communicating on a repeater channel Y. The mobile radio transceiver, being in the idle mode, continuously scans channels searching for a call signalling sequence identifying the group(s) to which it is assigned (block 402, 403). No such signalling tones will be detected because the mobile radio transceiver's group is busy communicating on a communications channel already dedicated to it (unless, of course, the transceiver is a member of more than one group and a call directed to another group of which it is a member is transmitted). The operator can choose to permit his or her transceiver to remain in the idle mode, and is under no compulsion to join communications with the group.

Suppose, however, that the operator decides he wishes to join the ongoing conversation. The operator simply keys his or her transceiver (e.g. by depressing the microphone push-to-talk button) (block 404), thereby causing the mobile transceiver to enter the "wait" mode and to transmit the call signalling sequence associated with the group on a free repeater channel if one exists (block 406, see FIG. 11).

If the free channel is not granted (block 408), the mobile transceiver remains in the "wait" mode and tries to acquire another free channel (this is the reason why a repeater grants a channel temporarily in response to an invalid call signalling sequence or a call to be joined). Once a channel is granted to the transceiver, the mobile transceiver locks onto the channel and enables its audio circuitry in preparation for communication (block 410). The repeater transmits a join alert tone over the granted channel (as discussed previously) which the operator of the mobile radio transceiver hears through the mobile transceiver speaker. The repeater then discontinues transmission of the busy signal (block 412), causing the mobile transceiver to drop off the channel (block 414) and return to the "idle" mode (block 402, see FIG. 12).

The repeater waits a predetermined period of time $\tau_{delay}$ (as described previously in connection with FIG. 3B) to give the mobile transceiver time to drop off the channel and to begin scanning communications channels once again (block 402). After the period $\tau_{delay}$ has elapsed, the repeater operating on the channel already dedicated to the group the calling mobile radio transceiver wishes to join transmits the group call signalling sequence. Since the mobile radio transceiver is in the "idle" mode, it detects and decodes these tones (block 403), and determines that they correspond to the call signalling sequence assigned to the mobile transceiver (block 416). The mobile transceiver locks onto channel Y (block 410), and joins the ongoing communications occurring thereon.

In the preferred embodiment, a calling mobile transceiver locates the channel which it is to join by returning to the "idle" mode and scanning the communications channels listening for a call signalling sequence directed to it. Hence, relatively unsophisticated transceivers with minimal "intelligence" can join an existing conversation in the preferred embodiment. In systems in which all mobile transceivers are relatively sophisticated, however, it may be desirable to avoid interrupting the ongoing conversation to be joined with the transmission of a call signalling sequence.

In an alternate embodiment of the present invention, the repeater transceiver receiving a call from a mobile transceiver which is to join an ongoing conversation responds to the call by transmitting, over the channel occupied by the calling mobile transceiver, information identifying the communications channel on which the ongoing conversation is occurring. The calling mobile transceiver receives and decodes this channel-identifying information, stores it in an internal memory, and sets its transmitter and receiver oscillator frequencies in accordance with it (thereby locking onto the channel on which the ongoing communications is occuring). In this way, a join is accomplished by transmitting information to the mobile transceiver to be joined over the unused channel on which the mobile transceiver initiates a call, rather than on the communications channel it is to join. This alternate arrangement can be implemented using tone signalling, digital signalling or other signalling protocols (as can the arrangement already described) and avoids the inconvenience of interrupting ongoing communications temporarily to accomplish a join, but does requires some additional intelligence in each mobile transceiver.

FIG. 13 is a flow chart of the "land line call processing routine" called by block 260 shown in FIG. 7. As mentioned briefly previously, calls to mobile radio transceivers of system 50 can be initiated either by a call from other mobile radio transceivers (as has been described) or by a call received from a land line. Telephone interconnect network 56 is a conventional telephone switching network that automatically "answers" (i.e. takes off hook) a "ringing" telephone line (i.e. a line carrying a ring signal thereon) and assigns the telephone line to a free communications channel X and its associated repeater transceiver (block 350). Telephone interconnect network 56 does not "scan" repeater communications channels to locate a vacant channel in the same manner as does a mobile radio transceiver in the "idle" mode, but instead attempts to connect an active land line to each repeater R1 through RN in sequence until an inactive repeater is found. Consequently, the connection does not take place until a repeater becomes available.

If telephone interconnect network 56 is successful in assigning a land line call to a free channel, the interconnect network completes the analog signal path 66 between the repeater transceiver operating on that channel (e.g. R2) and the telephone interconnect network. The land line caller is then expected to transmit a sequence of tones to repeater base station 52 which identifies the group 54 of mobile radio transceivers to be called. These tones are decoded by the repeater transceiver in a conventional manner (block 352).

The repeater sends a message to site controller 60 which requests validation of the decoded tones. Site controller 60 indexes the decoded tone information in tables 160 and 164, and decides: (1) whether the group the land line caller has requested contact with is a valid group (by reading the value of the "valid flag" associated with the appropriate group field of validity table 164); and (2) whether the group, if "valid," is already communicating on any other repeater communications channel (by reading the group fields of each of the blocks 162 of status information associated with the various repeaters R1 through RN).

If the group of mobile transceivers the land line caller wishes to contact is not already communicating on another channel and is a "valid" group, site controller 60 in the preferred embodiment sends a message to the repeater transceiver interconnected with the land line directing it to transmit the call signalling sequence identifying the group of mobile radio transceivers which the land line caller desires to contact (blocks 354, 356) (in the preferred embodiment, the site controller sends a validation response "2" to the repeater transceiver). Meanwhile, site controller 60 updates the contents of the block of status information (e.g. block 162(2)) to reflect that the communications channel is busy handling a call for the group, and that the repeater is in the interconnect mode. The mobile radio transceivers in the group being called are collected onto channel X by the transmitted call signalling sequence, and the repeater permits voice communications to occur on channel X between the land line caller and the mobile radio transceivers (simply by closing switches 130a and 130b shown in FIG. 4).

If the group identified by the signal transmitted by the land line caller is already busy communicating on another repeater communications channel Y, site controller 60 reads the value of the interconnect flag of the status block 162 associated with the repeater operating on channel Y to determine whether that repeater is in the interconnect mode (block 358). If the repeater is in the interconnect mode, it is not possible to connect the land line to the repeater in the preferred embodiment (since only one land line at a time may be connected to a repeater transceiver). A busy tone is applied to the land line to request the land line caller to try again later, and the land line is disconnected (block 360) (these events are brought about by transmitting the message "D" from site controller 60 to the proper repeater transceiver). If desired, an alert tone may be transmitted over channel Y at this time to notify the group of mobile radio transceivers the land line caller desires to contact that a land line call was received but could not be handled (block 362).

As has been explained, the preferred embodiment could permit a land line to join ongoing communications between the mobile radio transceivers of a group if no other land line is already participating in the ongoing communications. To do this, telephone interconnect network 58 transfers the land line from channel X to channel Y (by simply disconnecting the analog signal path 66 between the interconnect network and the repeater operating on channel X and completing the analog signal path between the interconnect network and the repeater operating on channel Y) (block 364).

The repeater operating on channel Y then transmits the join alert tone over channel Y in the manner discussed previously (block 366) to warn the operators of the mobile radio transceivers in the group being joined that a join is about to occur (in the preferred embodiment, site controller 60 directs the repeater operating on channel Y to transmit an alert tone and then interconnect with the landline by sending to it the message "C0000" where "C" specifies a join and "0000" indicates that no call signalling sequence is to be transmitted). The land line audio is enabled onto channel Y (by closing the switches 1 30a and 130b of the repeater operating on channel Y), and site controller 60 updates the contents of the block 162 of status information associated with this repeater to reflect that the repeater is in the interconnect mode (block 368). The repeater operating on channel Y permits voice communications between the mobile radio transceivers of the identified group and the land line caller to proceed.

The present invention permits a mobile transceiver to rejoin communication with a group of mobile transceivers and/or a land line. Sometimes, the "group" of mobile transceivers engaged in communication with a land line over a communications channel may comprise a single transceiver. For example, it may be desirable to provide private communication between a single mobile transceiver and a land line caller. Such communcation can be initiated by either the single transceiver or by the land line caller using the call signalling sequence already described. When in the interconnect mode, repeater transceivers R1-RN in the preferred embodiment do not drop channel until 30 seconds have elapsed since the last mobile transceiver transmission is received. This rather long time-out period is provided to permit land line callers to speak uninterruptedly for a relatively long period of time. A mobile transceiver has sufficient time to drop off channel accidentally and rejoin communications on the channel during this time-out period. The manner in which the join occurs is precisely the same as that described in connection with FIGS. 3A and 3B, except that no mobile transceivers are operating on repeater channel Y from the time the single transceiver accidentally drops off channel until time $t_c'$, when the single mobile transceiver is reacquired onto the channel.

A join feature has been described which allows mobile radio transceivers to enter (join or rejoin) a conversation in progress on a busy repeater communications channel. When a mobile radio transceiver initiates a call using a call signalling sequence which was used to initiate ongoing communications on another communications channel, the mobile radio transceiver is permitted to acquire a free channel but is then dropped from the channel it acquired as if it were an invalid user. Once dropped, the mobile radio transceiver returns to the "idle" (scanning) mode and resumes scanning channels. After the mobile transceiver returns to the scanning mode, the mobile transceiver is immediately collected onto the busy channel, which generates the call signalling sequence upon command from the site controller. The users on the busy channel are notified that a join is about to commence by receipt of a join alert tone just prior to the generation of the tone signalling used to bring up a joining mobile transceiver.

In accordance with the present invention, users can join or rejoin an existing conversation so long as a communications channel is free to initiate a join. No dedicated control channel is necessary to implement the join feature. A mobile radio transceiver can drop a channel and not be forced back into the conversation (as occurs in data stream systems using dedicated control channels). Thus, a user can drop a channel, call another group of mobile radio transceivers or make a landline call, and then rejoin the original conversation. Moreover, users already on channel are notified that land line calls to their group are being attempted. Existing mobile radio transceivers need not be modified to implement the present invention, since they need not ever distinguish between a call initiating acquisition of a new channel and a call initiating a join (thus, even relatively "dumb" transceivers can be used to implement the join function). The repeater base station 52 in the preferred embodiment provides all of the intelligence necessary, and accomplishes the join feature through cooperation between two repeater transceivers. Of course, if relatively intelligent mobile transceivers are available, more advanced features (such as join without interruption of the ongoing conversation and join using digital signalling) may be provided, as have been described.

Although the preferred embodiment has been described in connection with a repeater base station 52 including a site controller, a site controller is not necessary to implement the present invention. Some manner in which repeater transceivers can communicate with one another must, however, be provided in order to facilitate cooperation between repeaters. In many systems in which a site controller is provided to calculate billing data and to perform other oversight functions, it will be most convenient to implement the join feature by providing the site controller with additional intelligence. However, in an alternate embodiment, each repeater transceiver is provided with sufficient intelligence to permit it (e.g. via data bus 64) to poll all other repeater transceivers of the system in order to determine whether a particular group of mobile radio transceivers has already acquired another communications channel, and to permit it to prompt the repeater operating on that other channel to transmit the call signalling sequence over that other channel to accomplish the join.

The present invention has been described in connection with a trunking radiotelephone communications system which does not use a dedicated control channel. It may, however, be desirable to implement the join feature in a system with a dedicated control channel. As described previously; systems using a dedicated control channel constantly transmit a stream of digital data over the control channel, this control channel being monitored by all mobile transceivers not engaged in communications on a voice channel. The control channel forces all mobile transceivers of a group to lock onto a voice communications channel over which group communication is occurring or is to occur. To implement a join feature in such a system, it is necessary to permit the operator of a mobile radio transceiver to selectively inhibit his/her transceiver from responding to signals transmitted over the control channel directing the transceiver to join particular conversations.

Thus, each mobile transceiver can be provided with a control (e.g., a button) which, when operated, causes the transceiver to leave the voice channel it is operating upon and to inhibit response to signalling information transmitted on the control channel directing the transceiver back onto that voice channel. To rejoin the conversation, the transceiver can simply be re-enabled to respond to the control channel information.

Since it is desirable that the transceiver responds to the next group call, the mobile transceiver should be notified when the ongoing conversation it intentionally left has ended so that it can be re-enabled automatically at that time to respond to new group call signalling sequences transmitted on the control channel. One way of automatically re-enabling the mobile transceiver at the conclusion of the ongoing communication *not* to be joined is to associate a unique call identification code with each *conversation,* transmit the conversation identification code on the control channel along with other call signalling information directing mobile transceivers onto the channel on which the conversation is occurring, and selectively disable mobile transceivers from responding to call signalling information including particular conversation identifying codes. Alternatively, a predetermine message could be transmitted over the control channel periodically for a time (longer than the expected maximum duration of a conversation which may be limited to pre-fixed time-out period) after a conversation has ended to override the programming an operator may have given his or her mobile transceiver to ignore call signalling sequences identifying a particular group. In this way, the transceiver will not ignore later call signalling sequences identifying the group it previously left a conversation with.

The join feature as has been described is initiated voluntarily, i.e., by the operator of a mobile transceiver desiring to join an ongoing conversation. It may be desirable in some circumstances, however, to force all mobile transceivers in a particular group to rejoin priority group communications. A "forced" join can be accomplished by transmitting the join call signalling sequence on the communications channel dedicated to the group of transceivers in response to an event other than a call from a mobile transceiver on an unused channel. For example, a dispatcher might initiate transmission of the join call signalling sequence shown in FIG. 3B on a communications channel in use in order to make sure all transceivers of a group receive an important message (regardless of the intentions of the operators of the transceivers).

Moreover, there is no requirement that a call signalling sequence transmitted by a mobile transceiver to initiate a join be responded to by causing the calling transceiver to join the communications with the group of transceivers identified by the transmitted call signalling sequence. In some circumstances, it might be desirable to cause a mobile transceiver to join a different group of transceivers than the one identified by the call signalling sequence it transmits, or to join a conversation with a land line caller. Although the call signalling sequence transmitted by the repeater base station in response to the call transmitted by the mobile transceiver to be joined should identify a group of which the calling mobile transceiver is a member (otherwise, the calling mobile transceiver will not respond), the repeater-transmitted call signalling sequence need not identify the group the mobile transceiver requested to join. Selection by the repeater base station of the conversation to be joined may take into account the number of factors, such as the relative importance (priority) of two or more conversations the mobile transceiver is elligible to join.

Although in some applications it might be desireable to join the landline caller to ongoing communications, in the preferred embodiment a busy signal is sent to a land line caller and the landline call is disconnected. Such a system transmits an alert tone over the busy channel to the group of transceivers the landline caller attempted to contact to inform them a landline call had been received.

It will thus be seen that there has been provided a new and improved system and method for enabling the user of a mobile radio transceiver to readily and quickly join or rejoin communications already established and continuing on a communications channel. The invention is relatively simple and is simultaneously compatible with various different signalling formats. While the invention has been described with reference to particular presently preferred exemplary embodiments utilizing specific signalling formats, it is to be understood that many modifications may be made while retaining many of the novel advantages and features of the invention (for example, the present invention may be used advantageously with a variety of different call signalling protocols). The invention is not to be limited to the disclosed embodiments, but on the contrary, it is intended to cover various modifications and equivalent arrangements included within the spirit and scope of the appended claims, which scope is to be accorded the broadest interpretations so as to encompass all such modifications and equivalent structures.

What is claimed is:

1. In a trunking radio transceiver of the type which operates on a plurality of channels, the improvement comprising:
  means for controlling said transceiver to (1) transmit, on a non-used channel X, a request to join ongoing transceiver communications being conducted over a further channel Y, (2) thereafter leave said channel X and scan said plural channels, and (3) thereafter tune to said channel Y in response to signalling transmitted to said transceiver so as to permit transceiver participation in said ongoing transceiver communications thereon.

2. A method for establishing communication between a first radio transceiver and a further radio transceiver comprising the steps of:
  (1) transmitting a first calling signal from said first radio transceiver to said further radio transceiver over a communication channel Y;
  (2) in response to said calling signal transmitted by said transmitting step (1), transmitting, with said further radio transceiver, a further calling signal identifying said first radio transceiver over a communication channel X different from said channel Y;
  (3) receiving said further calling signal with said first radio transciever; and
  (4) in response to said received further calling signal, operating said first radio transceiver on said channel X.

3. A method of operating a trunking radio transceiver of the type having a plurality of communication channels, comprising the steps of:
  (1) transmitting on a non-used channel X a request to join ongoing transceiver communications being conducted over a further channel Y;
  (2) thereafter leaving said channel X and scanning said plural channels;
  (3) thereafter operating on said further channel Y in response to signalling received by said radio transceiver; and
  (4) thereafter staying tuned to said channel Y so as to permit transceiver participation in said ongoing transceiver 4. A method for establishing communication between radio transceivers via a fixed radio repeating station comprising the steps of:
  (1) dedicating a radio communications channel Y to a group of radio transceivers;
  (2) conducting transceiver communications over said channel Y between transceivers of said group via said fixed repeating station;
  (3) transmitting, from a radio transceiver to said repeating station, a request over a further radio communications channel X that a further radio transceiver be permitted to join the communications conducted by said conducting step (2) over said channel Y;
  (4) transmitting, with said repeating station over said channel Y, in response to said request, a pre-assigned calling sequence directed to said further radio transceiver; and
  (5) operating said further radio transceiver on said channel Y in response to said calling sequence transmitted by said transmitting step (4).

5. A method for establishing communication between radio transceivers comprising the steps of:
  (1) scanning plural repeater channels with a first radio transceiver to detect a non-used channel Y;
  (2) transmitting a pre-assigned calling sequence from said first transceiver over said channel Y;
  (3) re-transmitting said pre-assigned calling sequence with a repeater over said channel Y;
  (4) detecting said re-transmitted calling sequence with at least a second radio transceiver and, in response thereto, operating said second radio transceiver on said channel Y so as to permit communications between said first and second transceivers;
  (5) scanning said plural repeater channels with a third radio transceiver to locate a non-used channel X;
  (6) transmitting said pre-assigned calling sequence from said third radio transceiver over said channel X; and
  (7) in response to said sequence transmitted by said transmitting step (6), re-transmitting with said repeater said pre-assigned call signalling sequence over said channel Y.

6. A method as in claim 5 further including the steps, performed after said transmitting step (6), of:
  (a) scanning said plural channels with said third transceiver and detecting said pre-assigned calling sequence transmitted by said re-transmitting step (7);
  (b) operating said third radio transceiver on said channel Y in response to said calling sequence detected by said scanning and detecting step (a), thereby permitting communications between said third radio transceiver and said first and second transceivers over said channel Y.

7. In a radio communications system including (a) a radio repeater having plural communications channels C1–CN and (b) plural radio transceiver each capable of communications via any of said communications channels, a method for permitting communications between radio transceivers over one of said communications channels comprising the steps of:
  (1) scanning said communications channels C1–CN with each of a plurality of radio transceivers;
  (2) transmitting call signalling over a selected channel CK of said communications channels C1–CN with said radio repeater;
  (3) receiving said call signalling transmitted by said transmitting step (2) with said plurality of radio transceivers;
  (4) permitting communications over said repeater channel CK between said plurality of transceivers;
  (5) transmitting call signalling from a further radio transceiver over another selected channel CL different from said channel CK;
  (6) deciding in response to said signalling transmitted by said transmitting step (5) whether said further radio transceiver should join the communications permitted over said repeater channel CK by said permitting step (4); and
  (7) if said further radio transceiver should join said communications over said channel CK, performing the following steps:
    (a) scanning said communications channels C1–CN with said further radio transceiver,
    (b) transmitting call signalling with said radio repeater over said communications channel CK while said further radio transceiver is scanning said communications channels,
    (c) operating said further radio transceiver on said communications channel CK in response to said call signalling transmitting by such transmitting step (b), and
    (d) thereafter permitting communications over said repeater channel CK between said plurality of transceivers and said further transceiver.

8. A method of operating an improved trunking radio transceiver of the type which operates on a plurality of channels C comprising the steps of:
  (1) detecting a non-used channel C1 of said channels C;
  (2) transmitting signals on said channel C1 identifying at least one transceiver originally operating on a further channel C2 of said channels C;

(3) leaving said acquired channel C1 and scanning said plural channels;
(4) tuning to said further channel C2 and detecting signals thereon; and
(5) staying tuned to said further channel C2 in response to said signals detected by said step (4) and communication thereover.

9. The method of claim 8 in which said trunking radio transceiver was originally operating on channel C2, lost communication thereon, and reaquires said lost communication.

10. The method of claim 9 in which said trunking radio transceiver was originally communicating with a telephone interconnect network over channel C2.

11. The method of claim 8 in which said trunking radio transceiver acquires communication over channel C2 with a further transceiver originally operating on channel C2.

12. A method as in claim 8 further including the step of transmitting signals on said further channel C2 with a further radio transceiver in response to said signals transmitted by said transmitting step (2).

* * * * *